United States Patent
Shirakata et al.

(10) Patent No.: US 7,558,223 B2
(45) Date of Patent: Jul. 7, 2009

(54) OFDM RECEIVING METHOD OF OFDM RECEIVER FOR RECEIVING AN OFDM SIGNAL VIA A PLURALITY OF SPACE PATHS

(75) Inventors: Naganori Shirakata, Ibaraki (JP); Koichiro Tanaka, Takaraduka (JP); Shuya Hosokawa, Hirakata (JP)

(73) Assignee: Panasonic Corporation, Osaka (JP)

( * ) Notice: Subject to any disclaimer, the term of this patent is extended or adjusted under 35 U.S.C. 154(b) by 442 days.

(21) Appl. No.: 11/395,153

(22) Filed: Apr. 3, 2006

(65) Prior Publication Data
US 2006/0221808 A1 Oct. 5, 2006

(30) Foreign Application Priority Data
Apr. 4, 2005 (JP) ............................. 2005-107242

(51) Int. Cl.
H04J 3/06 (2006.01)
H04J 3/12 (2006.01)
(52) U.S. Cl. ..................... 370/280; 370/507; 370/526
(58) Field of Classification Search ................. 370/464, 370/480, 491; 379/338, 343
See application file for complete search history.

(56) References Cited

U.S. PATENT DOCUMENTS

| | | | | |
|---|---|---|---|---|
| 7,242,720 | B2 * | 7/2007 | Sugiyama et al. | 375/260 |
| 7,339,979 | B1 * | 3/2008 | Kelkar | 375/147 |
| 2003/0185147 | A1 * | 10/2003 | Taga et al. | 370/210 |
| 2003/0186666 | A1 * | 10/2003 | Sindhushayana | 455/260 |

FOREIGN PATENT DOCUMENTS

| | | |
|---|---|---|
| JP | 2003-204314 | 7/2003 |
| JP | 3590008 | 8/2004 |

* cited by examiner

*Primary Examiner*—Chi H Pham
*Assistant Examiner*—Fan Ng
(74) *Attorney, Agent, or Firm*—Wenderoth, Lind & Ponack, L.L.P.

(57) ABSTRACT

OFDM signals each including a plurality of subcarriers (including data carriers and pilot carriers) orthogonal to each other are received by a plurality of receiver antennas. The received OFDM signals are each OFDM-demodulated into a plurality of receive subcarriers. Based on the plurality of receive subcarriers, the propagation coefficients of a plurality of space paths are estimated. An inverse matrix of a propagation matrix whose elements are the estimated propagation coefficients is calculated. Interference cancellation is performed for the plurality of receive subcarriers by using the inverse matrix, and transmit subcarriers multiplexed in space are estimated. A reliability of the inverse matrix is calculated. A pilot carrier is extracted from the estimated transmit subcarriers, and the extracted pilot carrier is weighted according to the reliability. An error included in the plurality of receive subcarriers is corrected based on the weighted pilot carrier.

8 Claims, 24 Drawing Sheets

FIG. 21  PRIOR ART

Receive Frame 1 (601):

| 603 | | 605 | | | 701 |
|---|---|---|---|---|---|
| $T'_{1,1,1}$ | $T'_{1,2,1}$ | $D'_{1,3,1}$ | $D'_{1,4,1}$ | | $D'_{1,L,1}$ |
| $T'_{1,1,2}$ | $T'_{1,2,2}$ | $D'_{1,3,2}$ | $D'_{1,4,2}$ | | $D'_{1,L,2}$ |
| $T'_{1,1,3}$ | $T'_{1,2,3}$ | $P'_{1,3,3}$ | $P'_{1,4,3}$ | | $P'_{1,L,3}$ |
| $T'_{1,1,4}$ | $T'_{1,2,4}$ | $D'_{1,3,4}$ | $D'_{1,4,4}$ | | $D'_{1,L,4}$ |
| $T'_{1,1,5}$ | $T'_{1,2,5}$ | $D'_{1,3,5}$ | $D'_{1,4,5}$ | | $D'_{1,L,5}$ |
| $T'_{1,1,6}$ | $T'_{1,2,6}$ | $D'_{1,3,6}$ | $D'_{1,4,6}$ | | $D'_{1,L,6}$ |
| $T'_{1,1,7}$ | $T'_{1,2,7}$ | $P'_{1,3,7}$ | $P'_{1,4,7}$ | | $P'_{1,L,7}$ |
| $T'_{1,1,8}$ | $T'_{1,2,8}$ | $D'_{1,3,8}$ | $D'_{1,4,8}$ | | $D'_{1,L,8}$ |
| $T'_{1,1,9}$ | $T'_{1,2,9}$ | $D'_{1,3,9}$ | $D'_{1,4,9}$ | .... | $D'_{1,L,9}$ |
| $T'_{1,1,10}$ | $T'_{1,2,10}$ | $D'_{1,3,10}$ | $D'_{1,4,10}$ | | $D'_{1,L,10}$ |
| $T'_{1,1,11}$ | $T'_{1,2,11}$ | $P'_{1,3,11}$ | $P'_{1,4,11}$ | | $P'_{1,L,11}$ |
| $T'_{1,1,12}$ | $T'_{1,2,12}$ | $D'_{1,3,12}$ | $D'_{1,4,12}$ | | $D'_{1,L,12}$ |
| $T'_{1,1,13}$ | $T'_{1,2,13}$ | $D'_{1,3,13}$ | $D'_{1,4,13}$ | | $D'_{1,L,13}$ |
| $T'_{1,1,14}$ | $T'_{1,2,14}$ | $D'_{1,3,14}$ | $D'_{1,4,14}$ | | $D'_{1,L,14}$ |
| $T'_{1,1,15}$ | $T'_{1,2,15}$ | $P'_{1,3,15}$ | $P'_{1,4,15}$ | | $P'_{1,L,15}$ |
| $T'_{1,1,16}$ | $T'_{1,2,16}$ | $D'_{1,3,16}$ | $D'_{1,4,16}$ | | $D'_{1,L,16}$ |
| $T'_{1,1,17}$ | $T'_{1,2,17}$ | $D'_{1,3,17}$ | $D'_{1,4,17}$ | | $D'_{1,L,17}$ |

Receive Frame 2 (602):

| 604 | | 606 | | | 701 |
|---|---|---|---|---|---|
| $T'_{2,1,1}$ | $T'_{2,2,1}$ | $D'_{2,3,1}$ | $D'_{2,4,1}$ | | $D'_{2,L,1}$ |
| $T'_{2,1,2}$ | $T'_{2,2,2}$ | $D'_{2,3,2}$ | $D'_{2,4,2}$ | | $D'_{2,L,2}$ |
| $T'_{2,1,3}$ | $T'_{2,2,3}$ | $P'_{2,3,3}$ | $P'_{2,4,3}$ | | $P'_{2,L,3}$ |
| $T'_{2,1,4}$ | $T'_{2,2,4}$ | $D'_{2,3,4}$ | $D'_{2,4,4}$ | | $D'_{2,L,4}$ |
| $T'_{2,1,5}$ | $T'_{2,2,5}$ | $D'_{2,3,5}$ | $D'_{2,4,5}$ | | $D'_{2,L,5}$ |
| $T'_{2,1,6}$ | $T'_{2,2,6}$ | $D'_{2,3,6}$ | $D'_{2,4,6}$ | | $D'_{2,L,6}$ |
| $T'_{2,1,7}$ | $T'_{2,2,7}$ | $P'_{2,3,7}$ | $P'_{2,4,7}$ | | $P'_{2,L,7}$ |
| $T'_{2,1,8}$ | $T'_{2,2,8}$ | $D'_{2,3,8}$ | $D'_{2,4,8}$ | | $D'_{2,L,8}$ |
| $T'_{2,1,9}$ | $T'_{2,2,9}$ | $D'_{2,3,9}$ | $D'_{2,4,9}$ | .... | $D'_{2,L,9}$ |
| $T'_{2,1,10}$ | $T'_{2,2,10}$ | $D'_{2,3,10}$ | $D'_{2,4,10}$ | | $D'_{2,L,10}$ |
| $T'_{2,1,11}$ | $T'_{2,2,11}$ | $P'_{2,3,11}$ | $P'_{2,4,11}$ | | $P'_{2,L,11}$ |
| $T'_{2,1,12}$ | $T'_{2,2,12}$ | $D'_{2,3,12}$ | $D'_{2,4,12}$ | | $D'_{2,L,12}$ |
| $T'_{2,1,13}$ | $T'_{2,2,13}$ | $D'_{2,3,13}$ | $D'_{2,4,13}$ | | $D'_{2,L,13}$ |
| $T'_{2,1,14}$ | $T'_{2,2,14}$ | $D'_{2,3,14}$ | $D'_{2,4,14}$ | | $D'_{2,L,14}$ |
| $T'_{2,1,15}$ | $T'_{2,2,15}$ | $P'_{2,3,15}$ | $P'_{2,4,15}$ | | $P'_{2,L,15}$ |
| $T'_{2,1,16}$ | $T'_{2,2,16}$ | $D'_{2,3,16}$ | $D'_{2,4,16}$ | | $D'_{2,L,16}$ |
| $T'_{2,1,17}$ | $T'_{2,2,17}$ | $D'_{2,3,17}$ | $D'_{2,4,17}$ | | $D'_{2,L,17}$ |

FIG. 24  PRIOR ART

Transmit Frame 1:

| 601 | 603 | | 605 | | 701 |
|---|---|---|---|---|---|
| | $T_{1,1,1}$ | null | $D_{1,3,1}$ | $D_{1,4,1}$ | $D_{1,L,1}$ |
| | null | $T_{1,2,2}$ | $D_{1,3,2}$ | $D_{1,4,2}$ | $D_{1,L,2}$ |
| | $T_{1,1,3}$ | null | $P_{1,3,3}$ | $P_{1,4,3}$ | $P_{1,L,3}$ |
| | null | $T_{1,2,4}$ | $D_{1,3,4}$ | $D_{1,4,4}$ | $D_{1,L,4}$ |
| | $T_{1,1,5}$ | null | $D_{1,3,5}$ | $D_{1,4,5}$ | $D_{1,L,5}$ |
| | null | $T_{1,2,6}$ | $D_{1,3,6}$ | $D_{1,4,6}$ | $D_{1,L,6}$ |
| | $T_{1,1,7}$ | null | $P_{1,3,7}$ | $P_{1,4,7}$ | $P_{1,L,7}$ |
| | null | $T_{1,2,8}$ | $D_{1,3,8}$ | $D_{1,4,8}$ | $D_{1,L,8}$ |
| TRANSMIT FRAME 1 | $T_{1,1,9}$ | null | $D_{1,3,9}$ | $D_{1,4,9}$ | $D_{1,L,9}$ |
| | null | $T_{1,2,10}$ | $D_{1,3,10}$ | $D_{1,4,10}$ | $D_{1,L,10}$ |
| | $T_{1,1,11}$ | null | $P_{1,3,11}$ | $P_{1,4,11}$ | $P_{1,L,11}$ |
| | null | $T_{1,2,12}$ | $D_{1,3,12}$ | $D_{1,4,12}$ | $D_{1,L,12}$ |
| | $T_{1,1,13}$ | null | $D_{1,3,13}$ | $D_{1,4,13}$ | $D_{1,L,13}$ |
| | null | $T_{1,2,14}$ | $D_{1,3,14}$ | $D_{1,4,14}$ | $D_{1,L,14}$ |
| | $T_{1,1,15}$ | null | $P_{1,3,15}$ | $P_{1,4,15}$ | $P_{1,L,15}$ |
| | null | $T_{1,2,16}$ | $D_{1,3,16}$ | $D_{1,4,16}$ | $D_{1,L,16}$ |
| | $T_{1,1,17}$ | null | $D_{1,3,17}$ | $D_{1,4,17}$ | $D_{1,L,17}$ |

Transmit Frame 2:

| 602 | 604 | | 606 | | 701 |
|---|---|---|---|---|---|
| | null | $T_{2,2,1}$ | $D_{2,3,1}$ | $D_{2,4,1}$ | $D_{2,L,1}$ |
| | $T_{2,1,2}$ | null | $D_{2,3,2}$ | $D_{2,4,2}$ | $D_{2,L,2}$ |
| | null | $T_{2,2,3}$ | $P_{2,3,3}$ | $P_{2,4,3}$ | $P_{2,L,3}$ |
| | $T_{2,1,4}$ | null | $D_{2,3,4}$ | $D_{2,4,4}$ | $D_{2,L,4}$ |
| | null | $T_{2,2,5}$ | $D_{2,3,5}$ | $D_{2,4,5}$ | $D_{2,L,5}$ |
| | $T_{2,1,6}$ | null | $D_{2,3,6}$ | $D_{2,4,6}$ | $D_{2,L,6}$ |
| | null | $T_{2,2,7}$ | $P_{2,3,7}$ | $P_{2,4,7}$ | $P_{2,L,7}$ |
| | $T_{2,1,8}$ | null | $D_{2,3,8}$ | $D_{2,4,8}$ | $D_{2,L,8}$ |
| TRANSMIT FRAME 2 | null | $T_{2,2,9}$ | $D_{2,3,9}$ | $D_{2,4,9}$ | $D_{2,L,9}$ |
| | $T_{2,1,10}$ | null | $D_{2,3,10}$ | $D_{2,4,10}$ | $D_{2,L,10}$ |
| | null | $T_{2,2,11}$ | $P_{2,3,11}$ | $P_{2,4,11}$ | $P_{2,L,11}$ |
| | $T_{2,1,12}$ | null | $D_{2,3,12}$ | $D_{2,4,12}$ | $D_{2,L,12}$ |
| | null | $T_{2,2,13}$ | $D_{2,3,13}$ | $D_{2,4,13}$ | $D_{2,L,13}$ |
| | $T_{2,1,14}$ | null | $D_{2,3,14}$ | $D_{2,4,14}$ | $D_{2,L,14}$ |
| | null | $T_{2,2,15}$ | $P_{2,3,15}$ | $P_{2,4,15}$ | $P_{2,L,15}$ |
| | $T_{2,1,16}$ | null | $D_{2,3,16}$ | $D_{2,4,16}$ | $D_{2,L,16}$ |
| | null | $T_{2,2,17}$ | $D_{2,3,17}$ | $D_{2,4,17}$ | $D_{2,L,17}$ |

FIG. 25  PRIOR ART

Transmit Frame 1 (601):

| 603 | | 605 | | | |
|---|---|---|---|---|---|
| T1,1,1 | null | D1,3,1 | D1,4,1 | .... | D1,L,1 |
| null | T1,2,2 | D1,3,2 | D1,4,2 | | P1,L,2 |
| T1,1,3 | null | P1,3,3 | D1,4,3 | | D1,L,3 |
| null | T1,2,4 | D1,3,4 | P1,4,4 | | D1,L,4 |
| T1,1,5 | null | D1,3,5 | D1,4,5 | | D1,L,5 |
| null | T1,2,6 | D1,3,6 | D1,4,6 | | P1,L,6 |
| T1,1,7 | null | P1,3,7 | D1,4,7 | | D1,L,7 |
| null | T1,2,8 | D1,3,8 | P1,4,8 | | D1,L,8 |
| T1,1,9 | null | D1,3,9 | D1,4,9 | | D1,L,9 |
| null | T1,2,10 | D1,3,10 | D1,4,10 | | P1,L,10 |
| T1,1,11 | null | P1,3,11 | D1,4,11 | | D1,L,11 |
| null | T1,2,12 | D1,3,12 | P1,4,12 | | D1,L,12 |
| T1,1,13 | null | D1,3,13 | D1,4,13 | | D1,L,13 |
| null | T1,2,14 | D1,3,14 | D1,4,14 | | P1,L,14 |
| T1,1,15 | null | P1,3,15 | D1,4,15 | | D1,L,15 |
| null | T1,2,16 | D1,3,16 | P1,4,16 | | D1,L,16 |
| T1,1,17 | null | D1,3,17 | D1,4,17 | | D1,L,17 |

Transmit Frame 2 (602):

| 604 | | 606 | | | |
|---|---|---|---|---|---|
| null | T2,2,1 | D2,3,1 | D2,4,1 | .... | D2,L,1 |
| T2,1,2 | null | D2,3,2 | D2,4,2 | | P2,L,2 |
| null | T2,2,3 | P2,3,3 | D2,4,3 | | D2,L,3 |
| T2,1,4 | null | D2,3,4 | P2,4,4 | | D2,L,4 |
| null | T2,2,5 | D2,3,5 | D2,4,5 | | D2,L,5 |
| T2,1,6 | null | D2,3,6 | D2,4,6 | | P2,L,6 |
| null | T2,2,7 | P2,3,7 | D2,4,7 | | D2,L,7 |
| T2,1,8 | null | D2,3,8 | P2,4,8 | | D2,L,8 |
| null | T2,2,9 | D2,3,9 | D2,4,9 | | D2,L,9 |
| T2,1,10 | null | D2,3,10 | D2,4,10 | | P2,L,10 |
| null | T2,2,11 | P2,3,11 | D2,4,11 | | D2,L,11 |
| T2,1,12 | null | D2,3,12 | P2,4,12 | | D2,L,12 |
| null | T2,2,13 | D2,3,13 | D2,4,13 | | D2,L,13 |
| T2,1,14 | null | D2,3,14 | D2,4,14 | | P2,L,14 |
| null | T2,2,15 | P2,3,15 | D2,4,15 | | D2,L,15 |
| T2,1,16 | null | D2,3,16 | P2,4,16 | | D2,L,16 |
| null | T2,2,17 | D2,3,17 | D2,4,17 | | D2,L,17 |

OFDM RECEIVING METHOD OF OFDM RECEIVER FOR RECEIVING AN OFDM SIGNAL VIA A PLURALITY OF SPACE PATHS

BACKGROUND OF THE INVENTION

1. Field of the Invention

The present invention relates to an OFDM receiving method and an OFDM receiver, for realizing multiplexed communications between a transmitter and a receiver via a plurality of paths obtained by space division.

2. Description of the Background Art

In recent years, an OFDM (Orthogonal Frequency Division Multiplexing) modulation scheme, being a type of a multi-carrier transmission scheme, has been employed for wireless LAN, and the like, as a modulation scheme with a high resistance to frequency selective fading, which occurs under a multi-path environment in mobile communications. In an attempt to further improve the frequency efficiency, methods have been proposed in the art, which use a plurality of transmitter antennas and a plurality of receiver antennas to form MIMO (Multi Input Multi Output) channels, thereby realizing multiplexed communications between a transmitter and a receiver via a plurality of paths obtained by space division. The receiver side estimates the inverse functions for the propagation coefficients of a plurality of paths based on signals from the receiver antennas and equalizes the received signals, thereby separating the transmit signals from different transmitter antennas. Thus, it is possible to realize as many channels as there are transmitter antennas.

An MIMO-OFDM modulation scheme has been proposed in the prior art, e.g., Japanese Patent 3590008, which is a combination of OFDM, which is resistant to multi-path environments, and MIMO, which can improve the frequency efficiency. FIGS. 18 and 19 show configurations of an OFDM transmitter 200 and an OFDM receiver 220, respectively, which use a conventional MIMO technique as disclosed in this patent document. FIGS. 18 and 19 show a 2×2 MIMO-OFDM configuration where there are two transmitter antennas and two receiver antennas.

Data modulated through a data modulating section 201 is divided into a portion for a transmitter antenna 206 and another portion for a transmitter antenna 207, and these portions are OFDM-modulated through OFDM modulating sections 202 and 203, respectively. In this process, signals necessary in the signal receiving process, such as preambles 601 and 602 (needed for synchronization) and training symbols 603 and 604 (needed for estimating propagation coefficients), are added, thereby forming a transmit frame 1 and transmit frame 2 (FIG. 20). The transmit frame 1 and the transmit frame 2 are converted to radio frequencies through frequency converting sections 204 and 205, and are transmitted from the transmitter antennas 206 and 207.

Signals transmitted from the plurality of transmitter antennas 206 and 207 arrive at a plurality of receiver antennas 208 and 209 via different paths. The propagation coefficient between a transmitter antenna and a receiver antenna is herein denoted as $h_{j,i}$, where i is the transmitter antenna number and j is the receiver antenna number. In the case of 2×2 MIMO, there are four transmission paths: $h_{1,1}$, $h_{1,2}$, $h_{2,1}$ and $h_{2,2}$. Then, the relationship between a transmit signal Si and a receive signal Rj is represented by Expressions (1) and (2) below.

$$R1 = h_{1,1} \times S1 + h_{1,2} \times S2 \quad (1)$$

$$R2 = h_{2,1} \times S1 + h_{2,2} \times S2 \quad (2)$$

If the propagation coefficients $h_{j,i}$ are uncorrelated to each other and the inverse function of $h_{j,i}$ can be obtained, it is possible to separate the transmit signals from the multiplexed receive signal. This can be achieved by, for example, obtaining the inverse matrix of a propagation matrix H whose elements are $h_{j,i}$ and then multiplying a matrix R of the receive signal Rj by the inverse matrix. Specifically, where $S = [S1, \ldots, SN]^T$ denotes a transmit signal matrix whose elements are the signals Si transmitted from a number N of transmitter antennas, $R = [R1, \ldots, RM]^T$ denotes a receive signal matrix whose elements are the signals Rj received by a number M of receiver antennas, and $H = h_{j,i}$ denotes a propagation matrix whose elements are a number M×N of propagation coefficients $h_{j,i}$ between the transmitter and receiver antennas, a receive signal R is represented as shown in Expression (3) below.

$$R = HS \quad (3)$$

Multiplying each side of Expression (3) by $W = H^{-1}$, which denotes the inverse matrix of the propagation matrix H, yields $WR = WHS = H^{-1}HS = S$. Thus, it is possible to separate transmit signals S from each other.

On the receiver side, radio signals received by the receiver antennas 208 and 209 are converted by frequency converting sections 210 and 211, respectively, to frequency bands suitable for signal processing operations. The converted receive signals are OFDM-demodulated through OFDM demodulating sections 212 and 213, and separated into a plurality of subcarrier signals as shown in FIG. 21. A transmission path estimating section 214 estimates the propagation coefficient $h_{j,i}$ for each path by using the training symbol added for the purpose of estimating the propagation coefficient. An inverse matrix calculating section 215 obtains the inverse matrix of the propagation matrix H whose elements are $h_{j,i}$. An interference canceling section 216 performs an interference cancellation operation for the receive subcarrier signals by using the inverse matrix of the propagation matrix H, thereby separating the multiplexed transmit signals from each other (channel separation) The separated transmit signals are demodulated through a data demodulating section 217.

Using the synchronization preambles, the OFDM demodulating sections 212 and 213 perform carrier wave frequency synchronization, clock synchronization and symbol synchronization, and corrects frequency errors and timing errors. Then, the time axis signal is converted to a frequency axis signal and is divided into subcarrier signals.

If a synchronization estimation error occurs, there will be a phase error in the subcarrier signals. If the phase error increases, it causes a demodulation error. In view of this, in a conventional OFDM transmission operation, a particular subcarrier is transmitted while being assigned a known phase (pilot carrier) so that the phase error can be estimated/corrected by using the received pilot carrier.

FIG. 22 shows an example of an MIMO-based OFDM receiver 230 with conventional phase error correction. Like elements to those shown in FIG. 19 will be denoted by like reference numerals and will not be further described below. A pilot extracting section 501 extracts the pilot carrier from among the subcarriers, which are obtained by channel separation through the interference canceling section 216. A phase error estimating section 502 estimates the phase error from a comparison between the phase of the extracted pilot carrier and the known phase used at the time of transmission. A correction section 503 corrects the data carrier so as to correct the estimated phase error, and the data demodulating section 217 demodulates the data.

The precision of the interference cancellation can be improved by repeating such a demodulation operation a number of times, as follows. The data demodulated through the data demodulating section 217 is re-modulated through a data modulating section 504 to produce a transmit signal. A replica producing section 505 multiplies the re-modulated transmit signal by the estimated propagation coefficient to produce a replica signal. The replica signal, regarded as an interfering signal, is subtracted from the receive signals, and the remaining signals are successively separated. There may be provided as many such demodulation stages 506 and 507 as needed.

However, simply combining OFDM modulation scheme with MIMO-based transmission path estimation, as in the MIMO-based OFDM receiver 220 disclosed in the above-specified patent document, poses problems as follows. Multiplication with the inverse matrix of the propagation coefficient matrix in the channel separation operation normalizes the amplitudes of the separated signals, irrespective of the original reception level. As a result, the noise level of a signal originally having a low reception level will be emphasized by the amplitude normalization. Therefore, if the phase error is obtained from the separated pilot carriers, the error in the estimation result may become significant due to the noise emphasis. Thus, it is not possible to properly correct the phase of the separated data carriers, resulting in a demodulation error.

With a configuration, such as that of the MIMO-based OFDM receiver 230 with phase error correction, which performs repeated demodulation by producing a replica signal and subtracting the replica signal from the receive signals, it is necessary, for each demodulation stage, to extract the pilot carrier and correct the phase error. Therefore, the receiver will become complicated and large in size.

SUMMARY OF THE INVENTION

Therefore, an object of the present invention is to provide an OFDM receiving method and an OFDM receiver capable of demodulating carriers without errors while accurately estimating the transmission paths even when realizing multiplexed communications between a transmitter and a receiver via a plurality of paths obtained by space division.

The present invention is directed to an OFDM receiving method and an OFDM receiver for receiving an OFDM signal via a plurality of space paths using a plurality of receiver antennas, the OFDM signal being transmitted from at least one transmitter antenna and including a plurality of subcarriers orthogonal to each other, the subcarriers including a data carrier which is assigned transmit data and a pilot carrier which is assigned a known phase and a known amplitude. In order to achieve the object set forth above, the OFDM receiving method and the OFDM receiver include the following steps (elements).

The steps (elements) are: a step of OFDM-demodulating each of the OFDM signals received by the plurality of receiver antennas into a plurality of receive subcarriers (a plurality of OFDM demodulating sections); a step of estimating propagation coefficients of the plurality of space paths based on the plurality of receive subcarriers (a transmission path estimating section); a step of calculating an inverse matrix of a propagation matrix whose elements are the estimated propagation coefficients (an inverse matrix calculating section); a step of performing interference cancellation for the plurality of receive subcarriers by using the inverse matrix, and estimating transmit subcarriers multiplexed in space (an interference canceling section); a step of calculating a reliability of the inverse matrix (a reliability calculating section); a step of extracting the pilot carrier from the estimated transmit subcarriers, and weighting the extracted pilot carrier according to the reliability (a weighted calculation section); and a step of correcting an error included in the plurality of receive subcarriers based on the weighted pilot carrier (a variation estimating section).

Preferably, the error correcting step (the variation estimating section) includes: a step of estimating an instantaneous variation of a demodulation error by using the weighted pilot carrier (an instantaneous variation estimating section); and a step of correcting the estimated transmit subcarriers according to the estimated instantaneous variation of the demodulation error (a carrier correcting section). The error correcting step (the variation estimating section) includes: a step of estimating a temporal variation of a demodulation error of a pilot carrier by using the weighted pilot carrier (a temporal variation estimating section); a step of estimating a temporal variation of the demodulation error for each subcarrier by interpolating the estimated temporal variation in a frequency direction (a frequency direction interpolation section); and a step of correcting the estimated propagation coefficients based on the estimated temporal variation of the demodulation error for each subcarrier (a propagation coefficient correcting section). Alternatively, all of these elements can be included. The estimated propagation coefficient may be corrected based on the estimated instantaneous variation of the demodulation error in the step of correcting the estimated propagation coefficient (the propagation coefficient correcting section), instead of in the step of correcting the estimated transmit subcarrier (the carrier correcting section).

The present invention is also directed to an OFDM receiving method and an OFDM receiver for receiving an OFDM signal via a plurality of space paths using a plurality of receiver antennas, the OFDM signal being transmitted from a plurality of transmitter antennas and including a plurality of subcarriers orthogonal to each other, the subcarriers including a data carrier which is assigned transmit data and a pilot carrier which is assigned a known phase and a known amplitude. In order to achieve the object set forth above, the OFDM receiving method and the OFDM receiver include the following steps (elements).

The steps (elements) are: a step of OFDM-demodulating each of the OFDM signals received by the plurality of receiver antennas into a plurality of receive subcarriers (a plurality of OFDM demodulating sections); a step of estimating propagation coefficients of the plurality of space paths based on the plurality of receive subcarriers (a transmission path estimating section); a step that is repeated an equal number of times to the number of receive subcarriers (a plurality of demodulation stages); a step of calculating a reliability of an inverse matrix obtained in the plurality of demodulation stages (a reliability calculating section); a step of extracting the pilot carrier from the transmit subcarriers estimated in the plurality of demodulation stages, and weighting the extracted pilot carrier according to the reliability (a weighted calculation section); and a step of estimating an instantaneous variation of a demodulation error and a temporal variation of the demodulation error for each estimated subcarrier based on the weighted pilot carrier, and correcting the estimated propagation coefficients based on the instantaneous variation and the temporal variation (a variation estimating section).

The step that is repeated an equal number of times to the number of receive subcarriers (the plurality of demodulation stages) includes, for each iteration, a step of calculating an inverse matrix of a propagation matrix whose elements are the estimated propagation coefficients (an inverse matrix calculating section); a step of performing interference cancellation for the plurality of receive subcarriers by using the inverse matrix, and estimating transmit subcarriers multiplexed in space (an interference canceling section); a step of demodulating the estimated transmit subcarriers to obtain transmit data (a data demodulating section); a step of re-modulating the demodulated transmit data to produce a plurality of subcarriers (a data modulating section); a step of multiplying the plurality of re-modulated subcarriers by the corrected propagation coefficients to produce a replica signal (a replica producing section); and a step of producing a subtracted signal obtained by subtracting the replica signal from the plurality of receive subcarriers, and outputting the produced subtracted signal, as a new set of receive subcarriers, to the interference canceling section of a subsequent demodulation stage (a calculation section).

In the present invention, a pilot carrier is weighted by the reliability of the inverse matrix of the propagation coefficient. Thus, it is possible to suppress the estimation error due to noise emphasis, and to accurately detect the transmitter-receiver error. Separated data carriers are corrected based on the instantaneous variation of the detected transmitter-receiver error. Thus, it is possible to reduce the demodulation error. The inverse matrix is obtained after correcting the estimated propagation coefficient based on the temporal variation of the detected transmitter-receiver error. Thus, it is possible to follow the variations in the propagation path and to improve the precision of the signal separation by the inverse matrix multiplication. Moreover, a replica signal is produced by using the corrected propagation coefficient, whereby it is possible to correct the error at once for all stages, which needs to be done in a repetitive decoding process.

These and other objects, features, aspects and advantages of the present invention will become more apparent from the following detailed description of the present invention when taken in conjunction with the accompanying drawings.

BRIEF DESCRIPTION OF THE DRAWINGS

FIG. 21 shows an example of subcarriers of receive frames;

FIG. 24 shows an example of subcarriers of transmit frames; and

FIG. 25 shows an exemplary arrangement of pilot carriers.

DESCRIPTION OF THE PREFERRED EMBODIMENTS

An OFDM receiver of the present invention will now be described with reference to the drawings. Each embodiment is directed to a case where signals are exchanged in 2×2 MIMO-OFDM transmission between an OFDM transmitter having two transmitter antennas and an OFDM receiver having two receiver antennas. The OFDM transmitter used herein is the conventional OFDM transmitter 200 shown in FIG. 18.

Before describing the OFDM receiver of the present invention, the OFDM transmitter 200 will first be described.

(Transmit Frame to be Transmitted by OFDM Transmitter)

Figure 20:
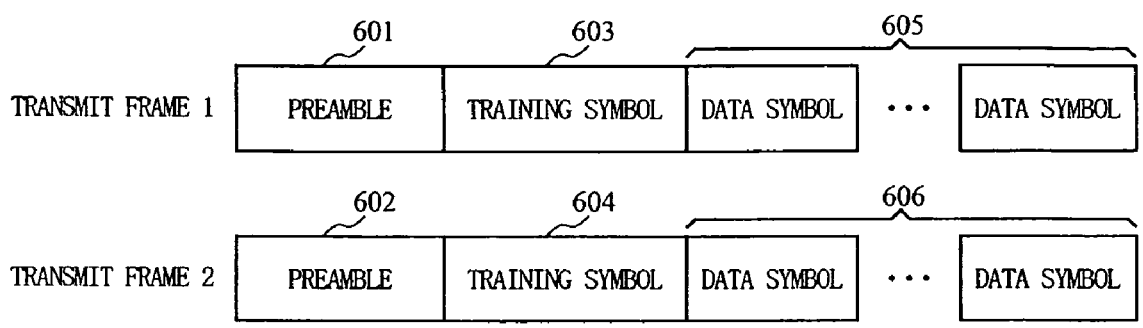
FIG. 20 shows an example of transmit frames.
Figure 22:
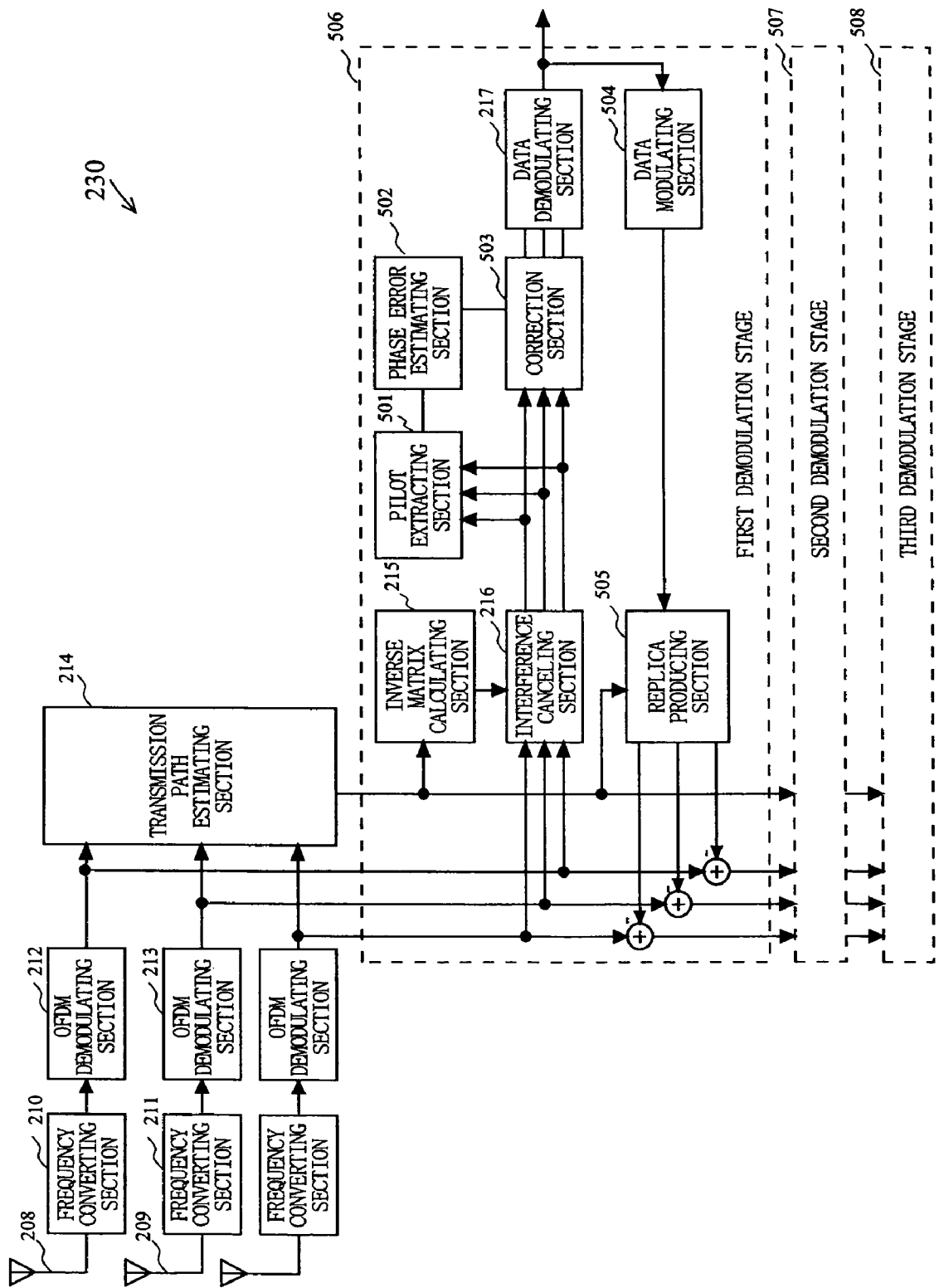
FIG. 22 is a block diagram showing a configuration of a conventional OFDM receiver 230.

The OFDM transmitter 200 transmits a transmit frame 1 and a transmit frame 2 as shown in FIG. 20. Different series of data are simultaneously transmitted from the transmitter antennas 206 and 207, thus realizing spatial multiplexing. The transmit frame 1 transmitted from the transmitter antenna 206 includes the preamble 601, the training symbol 603 and a data symbol 605. The transmit frame 2 transmitted from the transmitter antenna 207 includes the preamble 602, the training symbol 604 and a data symbol 606.

The preambles 601 and 602 are known signals that are used for purposes such as frame synchronization, frequency synchronization, clock synchronization, AGC and symbol synchronization, and may be in any signal form as long as it is suitable for these purposes. The preambles 601 and 602 may differ from one another for each of the transmitter antennas 206 and 207.

The training symbols 603 and 604 are known signals that are used for estimating the propagation coefficients $h_{j,i}$ of the transmission paths between the transmitter and receiver antennas in order to separate the spatially-multiplexed transmit signals from one another. The training symbols 603 and 604 may be symbols that are orthogonal to each other between transmitter antennas in terms of time, frequency, code or any combination thereof, in order to estimate the propagation coefficients $h_{j,i}$.

For example, the training symbol 603 maybe transmitted only from the transmitter antenna 206 at time t1, and the training symbol 604 may be transmitted only from the transmitter antenna 207 at time t2. Then, the OFDM receiver can estimate $h_{1,1}$ and $h_{2,1}$ from the training symbol 603 at time t1, and $h_{1,2}$ and $h_{2,2}$ from the training symbol 604 at time t2.

In this example, an OFDM signal is used as the training symbol, and therefore the signal transmission is done in the unit of subcarriers. For example, odd-numbered subcarriers of the training symbol 603 are transmitted from the transmitter antenna 206, and even-numbered subcarriers of the training symbol 604 are transmitted from the transmitter antenna 207. Then, switching around the order, even-numbered subcarriers of the training symbol 603 are transmitted from the transmitter antenna 206, and odd-numbered subcarriers of the training symbol 604 are transmitted from the transmitter antenna 207. Thus, the OFDM receiver can independently estimate $h_{j,i}$ for each subcarrier.

Figure 23:
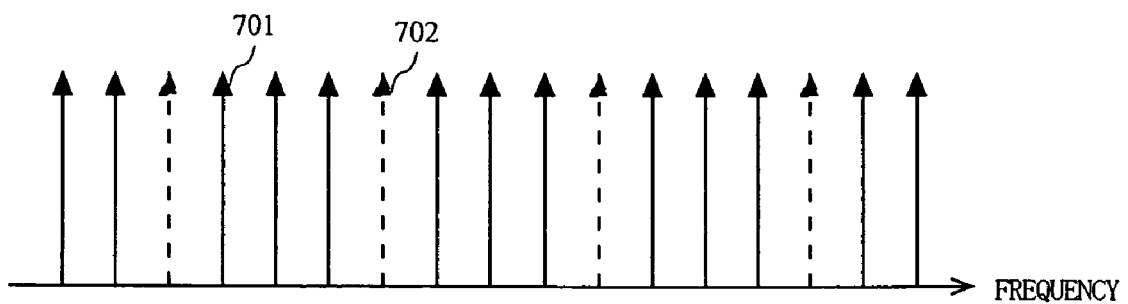
FIG. 23 shows an example of an OFDM symbol.

The data symbols 605 and 606 are each an OFDM signal obtained by orthogonally multiplexing a plurality of subcarriers on the frequency axis. FIG. 23 shows an example of an OFDM signal. In FIG. 23, one data symbol includes a plurality (17) of subcarriers. A predetermined one or predetermined ones of the subcarriers is/are a pilot carrier or pilot carriers 702 that is/are assigned a known phase and a known amplitude. Each subcarrier other than the pilot carrier 702 is a data carrier 701 that is assigned a phase and an amplitude based on the transmit data.

FIG. 24 shows an example of subcarriers of transmit frames. In FIG. 24, $T_{i,x,y}$ denotes a training carrier, $D_{i,x,y}$ a data carrier, $P_{i,x,y}$ a pilot carrier, and "null" a carrier whose amplitude is zero, where i is the transmitter antenna number, x is the symbol number, and y is the subcarrier number. The carriers $T_{i,x,y}$ and $P_{i,x,y}$ are each assigned a known phase and a known amplitude, whereas the carriers $D_{i,x,y}$ are each assigned a phase and an amplitude based on the transmit data.

The training symbols 603 and 604 include two OFDM symbols. In the first OFDM symbol, odd-numbered subcarriers ($T_{1,1,1}, T_{1,1,3}, \ldots, T_{1,1,17}$) are transmitted from the transmitter antenna #1 and even-numbered subcarriers ($T_{2,1,2}, T_{2,1,4}, \ldots, T_{2,1,16}$) are transmitted from the transmitter antenna #2. In the second OFDM symbol, even-numbered subcarriers ($T_{1,2,2}, T_{1,2,4}, \ldots, T_{1,2,16}$) are transmitted from the transmitter antenna #1 and odd-numbered subcarriers ($T_{2,2,1}, T_{2,2,3}, \ldots, T_{2,2,17}$) are transmitted from the transmitter antenna #2.

The data symbols 605 and 606 include a number L of OFDM symbols. Each of these OFDM symbols includes 13 data carriers and 4 pilot carriers. While the pilot carriers are assigned fixed subcarrier numbers ($P_{i,x,3}, P_{i,x,7}, P_{i,x,11}, P_{i,x,15}$) in this example, the subcarrier number may be varied for each symbol as shown in FIG. 25.

Figure 18:
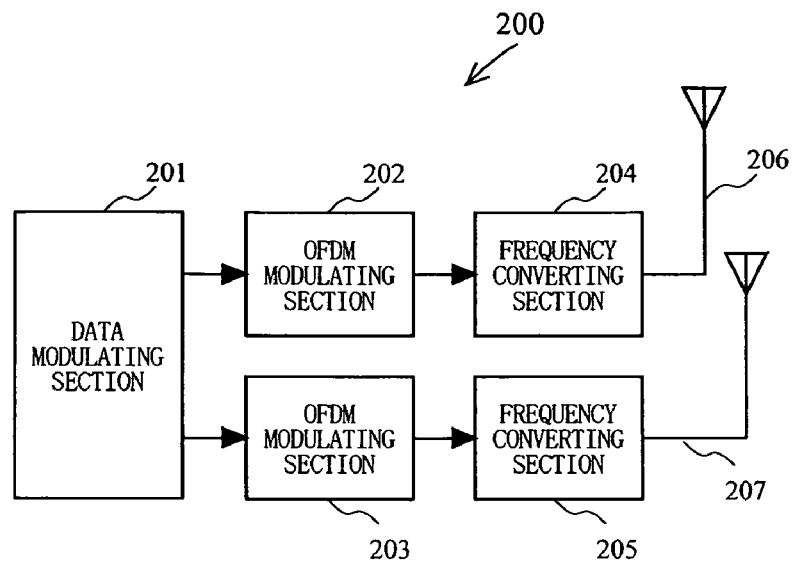
FIG. 18 is a block diagram showing a configuration of a conventional OFDM transmitter 200.
Figure 19:
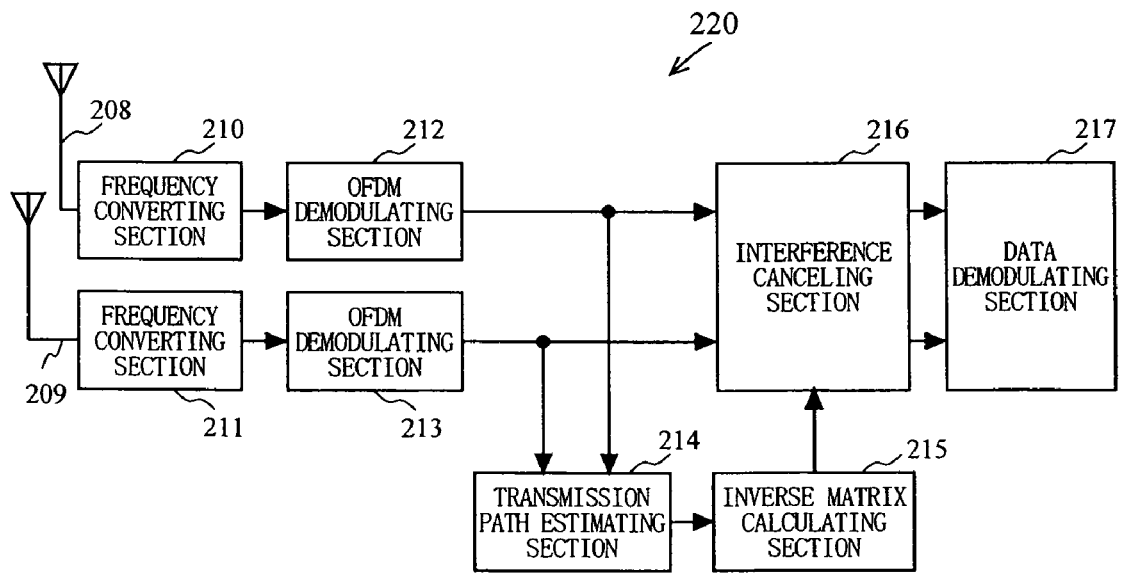
FIG. 19 is a block diagram showing a configuration of a conventional OFDM receiver 220.

Referring to FIG. 18, based on the data series transmitted from the transmitter antennas 206 and 207, the data modulating section 201 orthogonally multiplexes a plurality of subcarriers at the OFDM modulating sections 202 and 203 to produce time waveforms of the data symbols. The method of orthogonal multiplexing may be inverse Fourier transform, inverse wavelet transform or inverse discrete cosine transform. The OFDM modulating sections 202 and 203 add preambles and training symbols to the data symbol string, which has been converted to a time waveform, to produce transmit frames. The produced transmit frames are converted to radio frequencies through the frequency converting sections 204 and 205, and are simultaneously transmitted from the transmitter antennas 206 and 207.

First Embodiment

Figure 1:
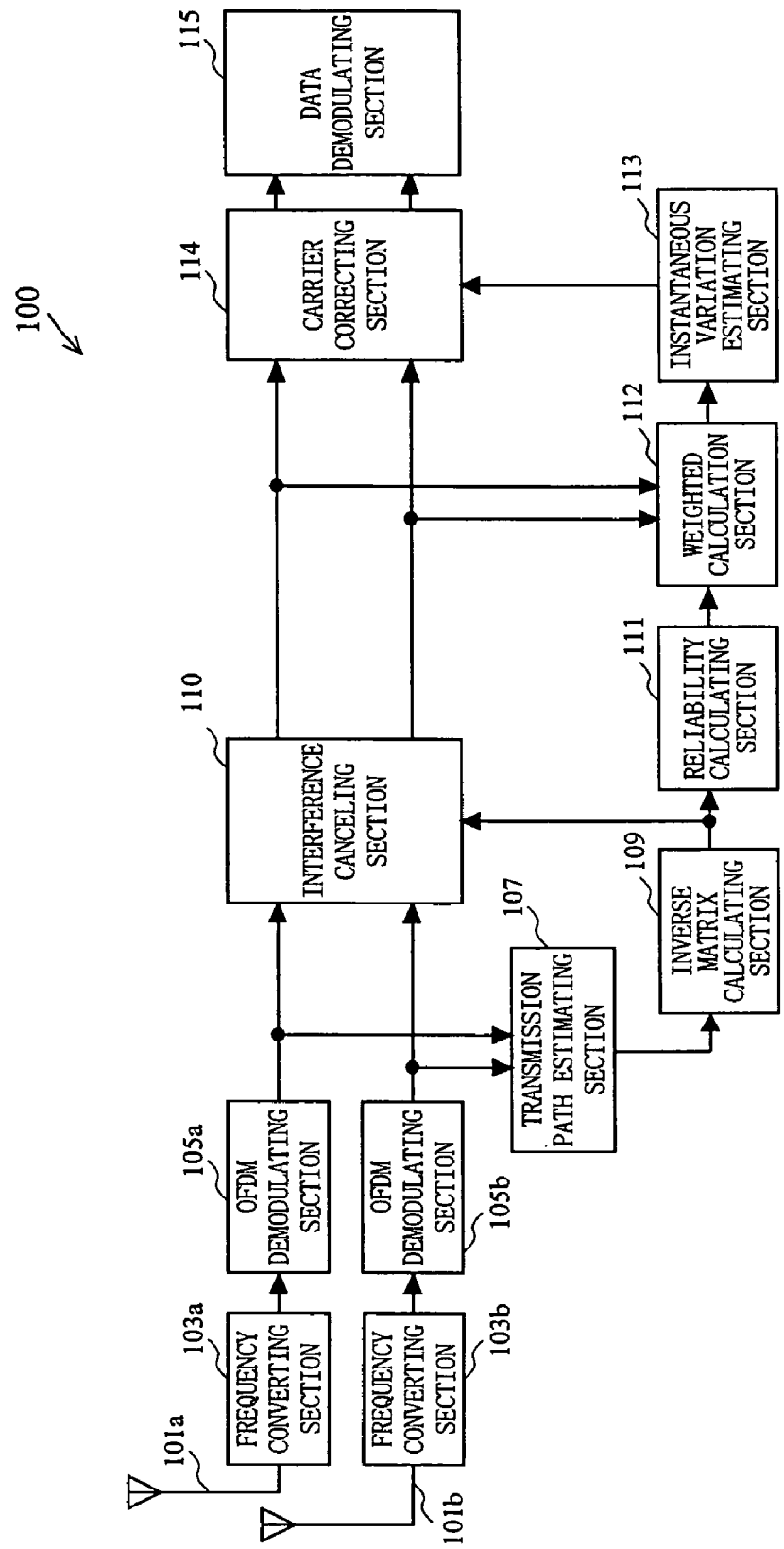
FIG. 1 is a block diagram showing a configuration of an OFDM receiver 100 according to a first embodiment of the present invention.

FIG. 1 is a block diagram showing a configuration of an OFDM receiver 100 according to a first embodiment of the present invention. Referring to FIG. 1, the OFDM receiver 100 of the first embodiment includes receiver antennas 101a and 101b, frequency converting sections 103a and 103b, OFDM demodulating sections 105a and 105b, a transmission path estimating section 107, an inverse matrix calculating section 109, an interference canceling section 110, a reliability calculating section 111, a weighted calculation section 112, an instantaneous variation estimating section 113, a carrier correcting section 114, and a data demodulating section 115.

The operation of various elements of the OFDM receiver 100 and the OFDM receiving method performed by the OFDM receiver 100 will now be described.

Figure 2:
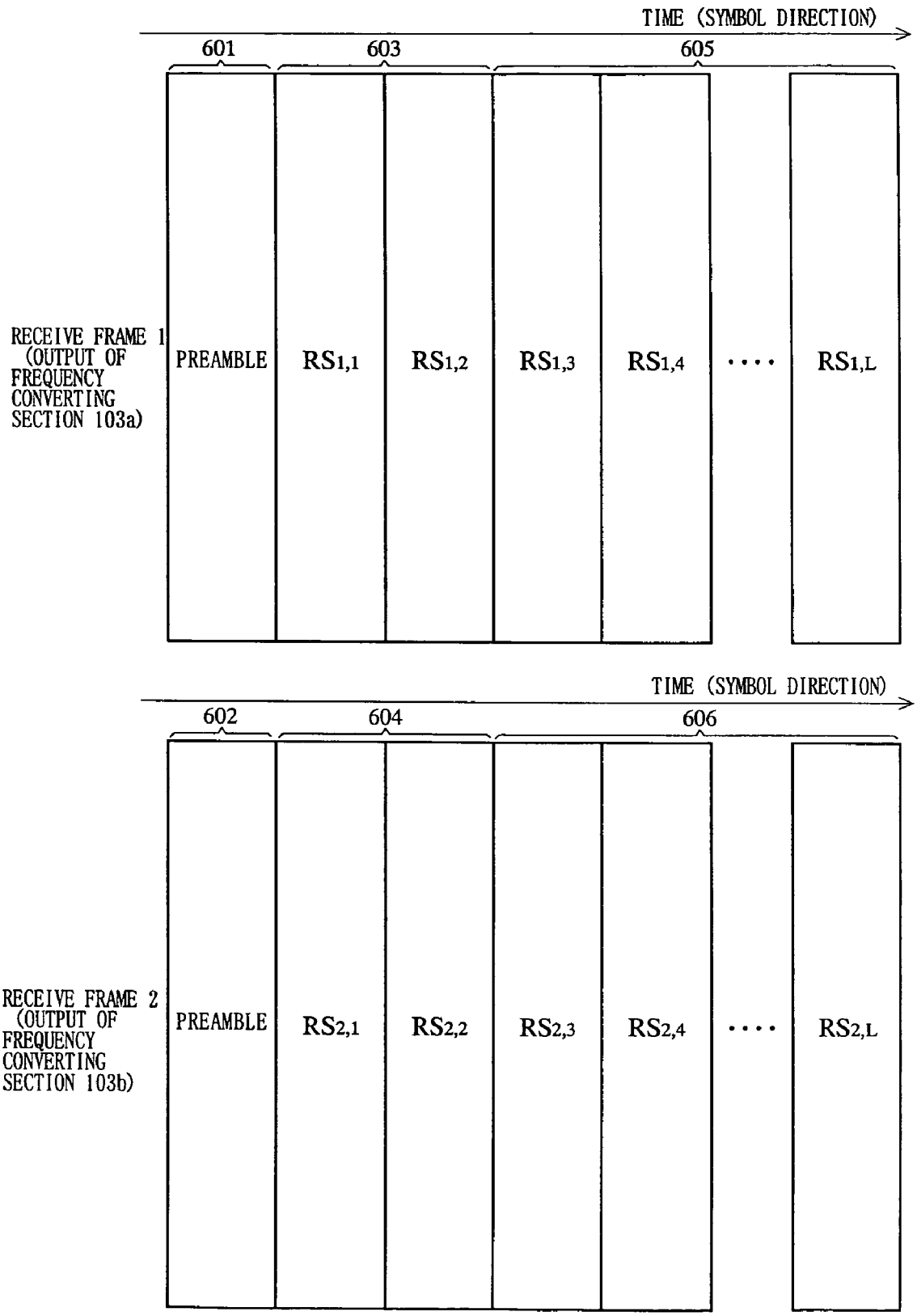
FIG. 2 illustrates receive frames outputted from frequency converting sections 103a and 103b.

Signals transmitted from the OFDM transmitter (the transmit frame 1 and the transmit frame 2) are received at the receiver antennas 101a and 101b, and are inputted to the frequency converting sections 103a and 103b. The frequency converting sections 103a and 103b convert the signals received at the receiver antennas 101a and 101b (the receive frame 1 and the receive frame 2) to time axis signals of a frequency band suitable for subsequent signal processing operations. The frequency-converted time axis signal can be calculated as shown in Expressions (4) and (5) below, and the receive frames can be illustrated as shown in FIG. 2. Herein, $TS_{i,x}$ denotes the transmit OFDM symbol, and $RS_{j,x}$ denotes the receive OFDM symbol. Moreover, $H_{j,i}$ denotes the transmission path characteristics in time axis representation.

$$RS_{1,x} = H_{1,1} \times TS_{1,x} + H_{1,2} \times TS_{2,x} \quad (4)$$

$$RS_{2,x} = H_{2,1} \times TS_{1,x} + H_{2,2} \times TS_{2,x} \quad (5)$$

Figure 3:
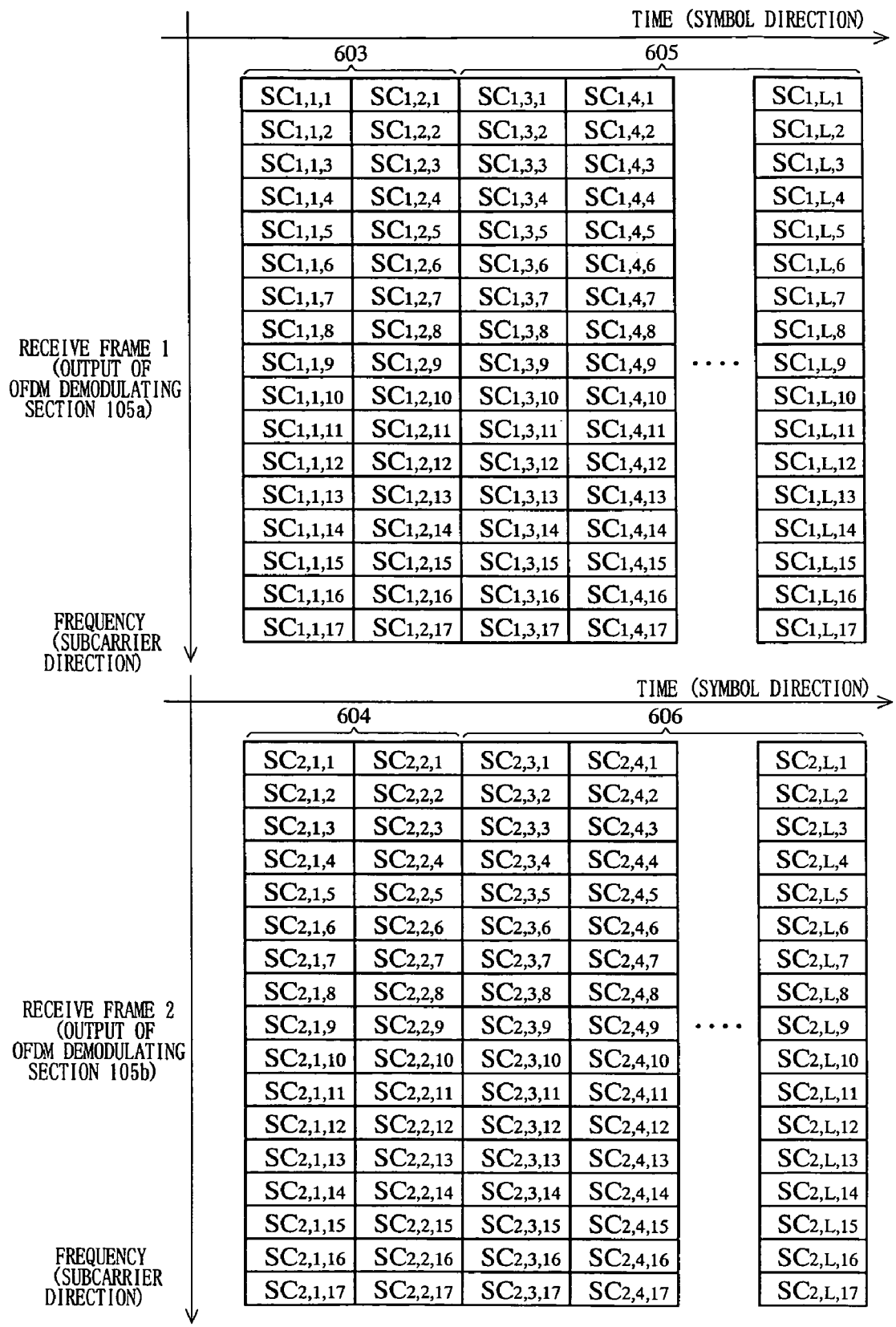
FIG. 3 illustrates receive frames outputted from OFDM demodulating sections 105a and 105b.

The OFDM demodulating sections 105a and 105b each divide a frequency-converted time axis signal into subcarriers and convert them to frequency axis signals. Specifically, the OFDM demodulating sections 105a and 105b perform receiver gain adjustment, frame synchronization, frequency synchronization and symbol synchronization, based on the preamble signals of the transmit frames, and divide the OFDM symbols into subcarriers based on the detected symbol timing. In this process, an inverse transform to that used in the orthogonal multiplexing process can be used, e.g., Fourier transform, wavelet transform, discrete cosine transform, etc. The frequency axis signal can be calculated as shown in Expressions (6) and (7) below. The receive frames can be illustrated as shown in FIG. 3. Herein, $TSC_{i,x,y}$ denotes transmit subcarriers, and $SC_{j,x,y}$ denotes receive subcarriers.

$$SC_{1,x,y} = h_{1,1,y} \times TSC_{1,x,y} + h_{1,2,y} \times TSC_{2,x,y} \quad (6)$$

$$SC_{2,x,y} = h_{2,1,y} \times TSC_{1,x,y} + h_{2,2,y} \times TSC_{2,x,y} \quad (7)$$

Figure 4:
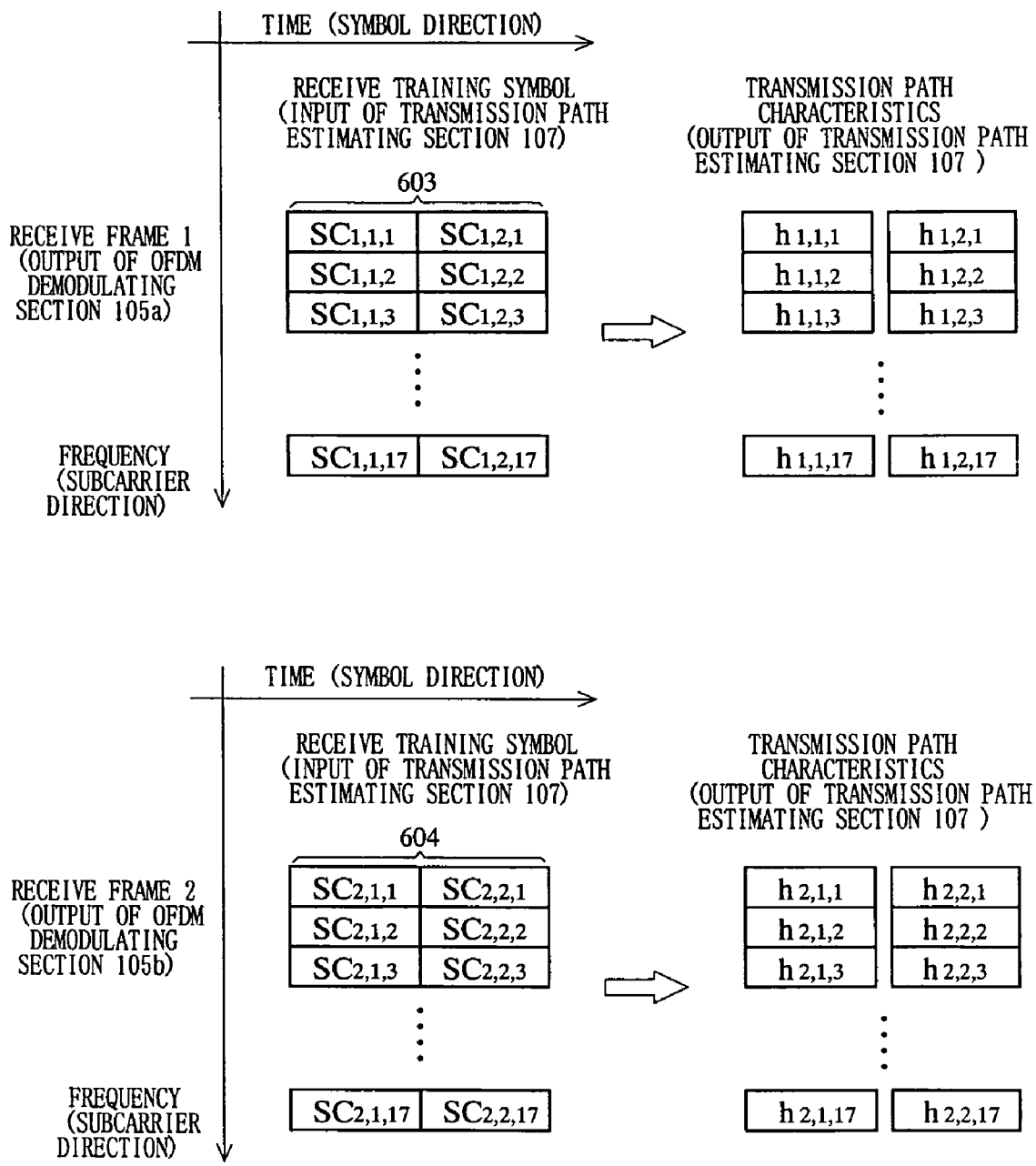
FIG. 4 illustrates the process performed by a transmission path estimating section 107.

Based on the separated receive subcarriers $SC_{j,x,y}$, the transmission path estimating section 107 estimates the propagation coefficient $h_{j,i}$ of each transmission path between the transmitter and receiver antennas. The propagation coefficient of each subcarrier is herein denoted as $h_{j,i,y}$. Since the training carriers $T_{i,x,y}$ are transmitted from only one antenna, it is possible to obtain the propagation coefficient $h_{j,i,y}$ by dividing the receive training carrier, i.e., the receive subcarrier $SC_{j,x,y}$, by a known transmit training carrier $T_{i,x,y}$. This is as shown in Expression (8) below. The receive frames can be illustrated as shown in FIG. 4.

$$h_{j,i,y} = SC_{j,x,y} / T_{i,x,y} \quad (8)$$

The receive subcarriers of the data symbols (the data carriers and the pilot carriers) are simultaneously transmitted from a plurality of antennas and multiplexed in space. Algorithms for separating spatially-multiplexed signals from one another include the ZF (Zero Forcing) algorithm and the MMSE (Minimum Mean Square Error) algorithm. With these algorithms, it is possible to obtain an inverse matrix W of the propagation matrix H whose elements are the propagation coefficients $h_{j,i}$, and multiply the receive signal by the inverse matrix W, thereby canceling the influence of the propagation coefficient for the signal to be separated and the influence of other signals being an interfering component. There are various methods, for different algorithms, for obtaining the inverse matrix. For example, with the ZF algorithm, the inverse matrix is $W=(H^H H)^{-1}H^H$, which is called a general inverse matrix, where $^H$ denotes the Hermitian transposition of a matrix. In the MMSE algorithm, $W=(H^* H^T+zI)^{-1}H^*$ is used, where * denotes a complex conjugate, $^T$ denotes a transposition, z denotes a noise power, and I denotes a unit matrix.

Figure 5:
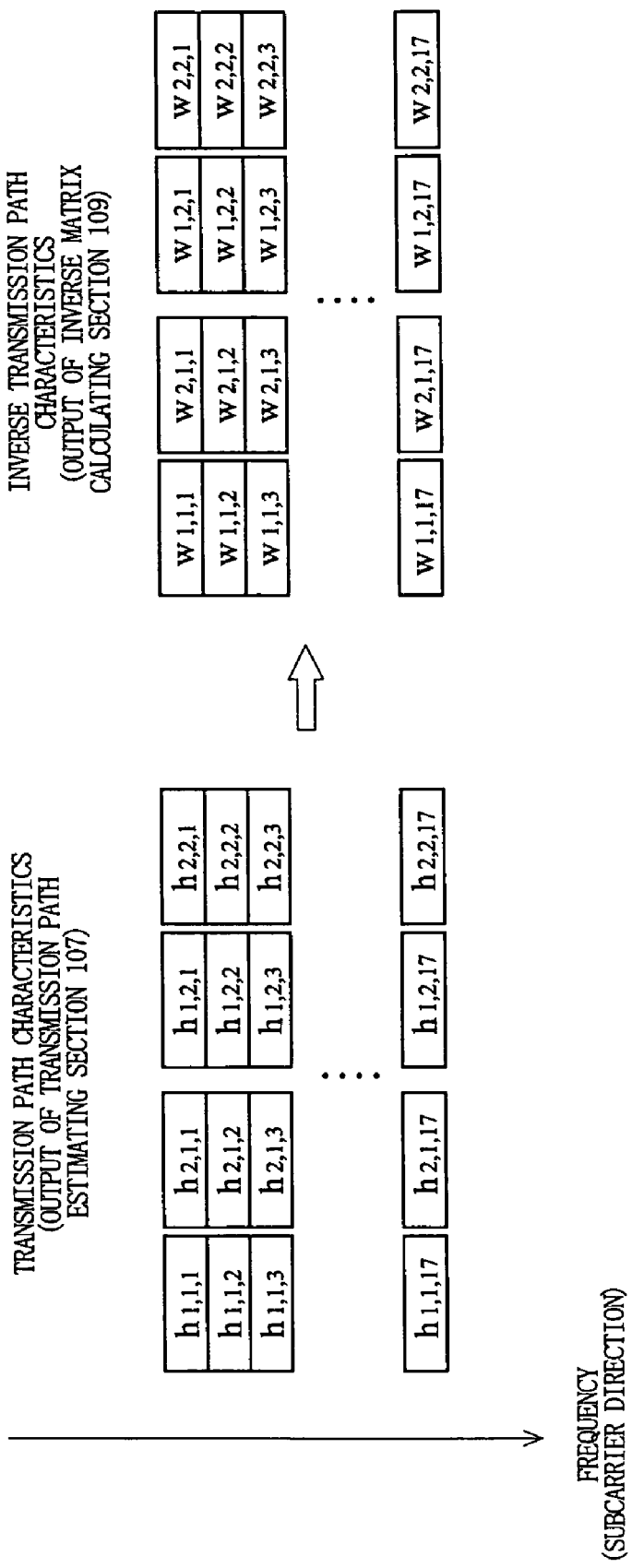
FIG. 5 illustrates the process performed by an inverse matrix calculating section 109.

For each subcarrier y, the inverse matrix calculating section 109 obtains an inverse matrix $W_y(=H_y^{-1})$ of the propagation matrix $H_y$, by using a propagation matrix $H_y$, whose elements are the propagation coefficients $h_{j,i,y}$. The propagation matrix $H_y$ and the inverse matrix $W_y$ can be obtained as shown in Expressions (9) and (10) below. The receive frames can be illustrated as shown in FIG. 5.

$$H_y = \begin{bmatrix} h_{1,1,y} & h_{1,2,y} \\ h_{2,1,y} & h_{2,2,y} \end{bmatrix} \quad (9)$$

$$W_y = \begin{bmatrix} w_{1,1,y} & w_{1,2,y} \\ w_{2,1,y} & w_{2,2,y} \end{bmatrix} = H_y^{-1} \quad (10)$$

The interference canceling section 110 performs interference cancellation for the receive subcarriers $SC_{j,x,y}$ of the data symbols by using the inverse matrix $W_y$, and separates the spatially-multiplexed transmit subcarriers $TSC'_{i,x,y}$ from one another. This separation is done by multiplying the receive signal matrix whose elements are the receive subcarriers $SC_{j,x,y}$ by the inverse matrix $W_y$, for each subcarrier, as shown in Expression (11) below.

$$\begin{bmatrix} TSC'_{1,x,y} \\ TSC'_{2,x,y} \end{bmatrix} = W_y H_y \begin{bmatrix} TSC_{1,x,y} \\ TSC_{2,x,y} \end{bmatrix} \quad (11)$$

$$= H_y^{-1} H_y \begin{bmatrix} TSC_{1,x,y} \\ TSC_{2,x,y} \end{bmatrix}$$

$$= \begin{bmatrix} 1 & 0 \\ 0 & 1 \end{bmatrix} \begin{bmatrix} TSC_{1,x,y} \\ TSC_{2,x,y} \end{bmatrix}$$

If it is possible to completely estimate the propagation matrix H and if there exists $H^{-1}$, $H^{-H}H=1$ (unit matrix) results, and therefore it is possible to separate signals multiplexed together. The amplitude of the separated signal at the time of transmission is recovered, and the separated signal has no influence from the transmission path characteristics.

Figure 6:
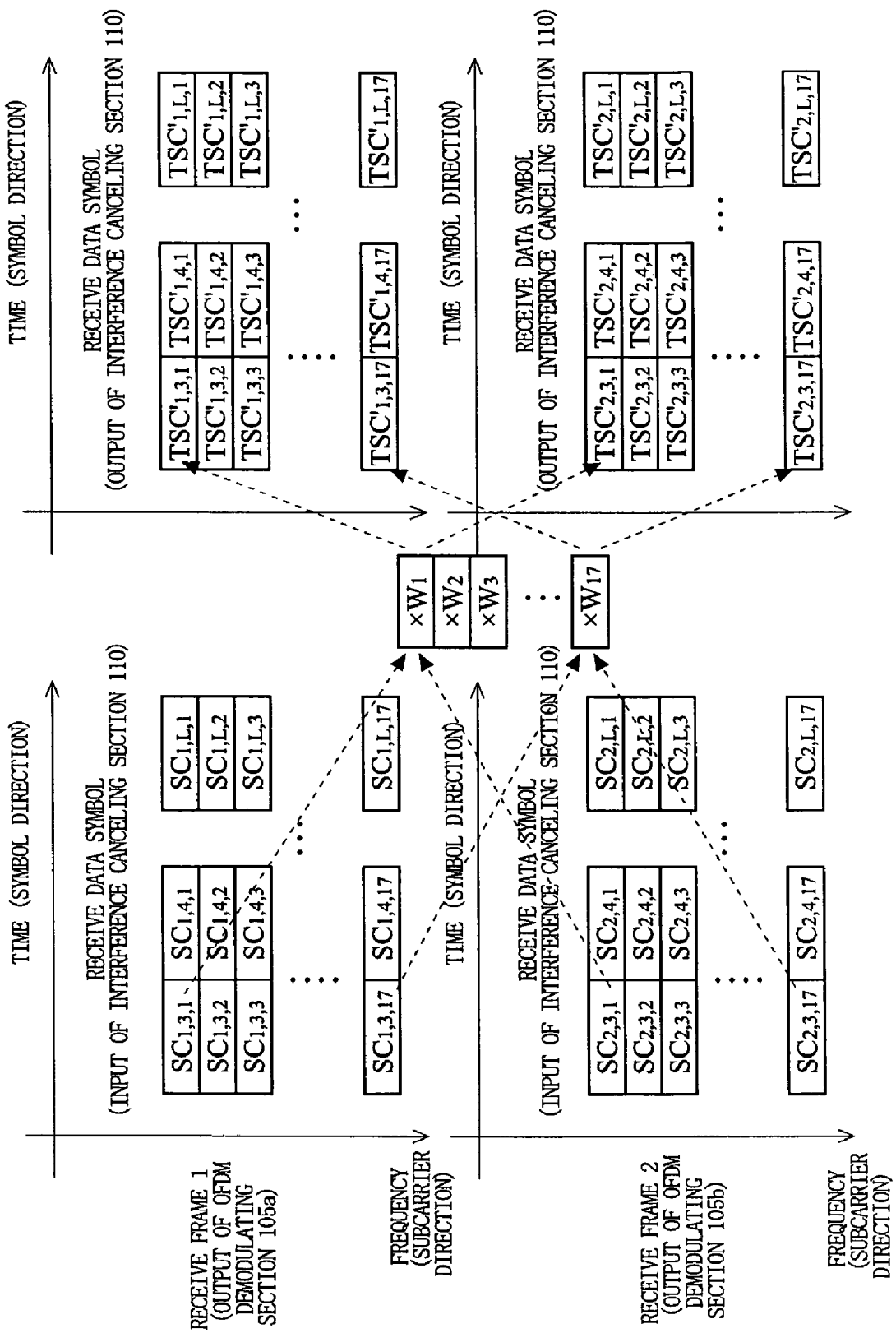
FIG. 6 illustrates the process performed by an interference canceling section 110.

Hereinafter, a data symbol string made up of separated subcarriers will be referred to as a stream. The data symbol string transmitted from transmitter antenna #1 will be referred to as a stream 1, and that from the transmitter antenna #2 as a stream 2. The data symbols can be illustrated as shown in FIG. 6.

However, the receive signal includes a transmitter-receiver synchronization error, a propagation coefficient estimation error and noise. For example, the transmitter-receiver synchronization error may be a carrier wave frequency error, a clock frequency error, a symbol timing error, a phase noise, or the like, and includes errors that could not be detected or corrected during preamble synchronization. The propagation coefficient estimation error includes errors such as a training symbol estimation error, or an error occurring due to variations in the transmission path after the estimation with the training symbols. Where the propagation coefficient is denoted as h, the transmitter-receiver error as e, the transmit signal as s, and the noise as n, the receive signal R can be expressed as shown in Expression (12) below.

$$R=h \times e \times s+n \quad (12)$$

Multiplying the receive signal R by an inverse function w, which satisfies $w \times h=1$ with respect to the propagation coefficient h, yields Expression (13) below.

$$w \times R=w \times h \times e \times s+w \times n=e \times s+w \times n \quad (13)$$

In other words, an estimated transmit signal contains a transmitter-receiver error and noise multiplied by an inverse function. Naturally, received signals have a constant noise level and varied receive signal levels depending on the propagation environments. However, with such an operation, the amplitude of the estimated transmit signal will be normalized to the level of the original transmit signal, irrespective of the level of the receive signal, and the noise thereof will be amplified by the inverse function.

The transmitter-receiver error e can be separated into an instantaneous variation component ea occurring due to phase noise, or the like, and a temporal variation component eb (e.g., a clock frequency error or a transmission path variation) being slow with respect to signals, and can be expressed as shown in Expression (14) below.

$$e=eb \times ea \quad (14)$$

The present invention solves the problems set forth above by correcting one or both of the instantaneous variation component ea or the temporal variation component eb. The first embodiment is directed to an example where only the instantaneous variation component ea is corrected, while the second and third embodiments are directed to other examples.

Therefore, the subcarriers (the data carriers and the pilot carriers) outputted from the interference canceling section 110 has its amplitude normalized, and its noise amplified based on the inverse matrix of the propagation matrix. When one obtains the difference between the estimated pilot carrier and the transmit pilot carrier in order to obtain the transmitter-receiver error e, a significant error may be caused by the amplified noise, whereby it may not be possible to accurately estimate the transmitter-receiver error e.

Therefore, in the present invention, the transmitter-receiver error e to be estimated from the estimated pilot carrier is weighted according to the inverse function w, and the data carrier is corrected according to the weight.

Figure 7:
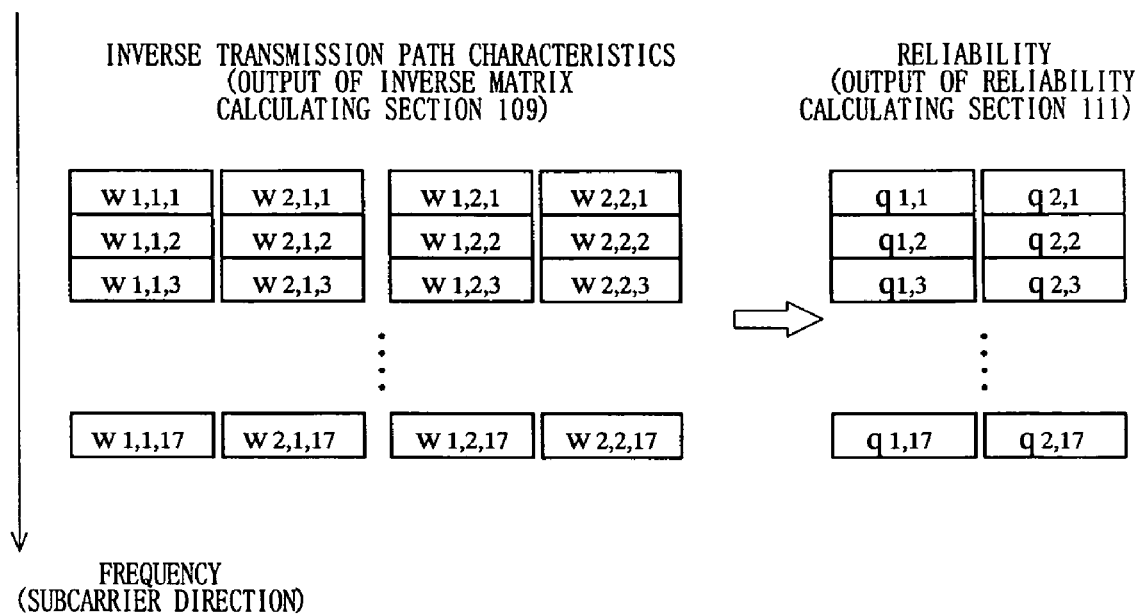
FIG. 7 illustrates the process performed by a reliability calculating section 111.

The reliability calculating section 111 calculates, for each subcarrier, the reliability $q_{i,y}$ of the subcarrier $TSC'_{i,x,y}$, separated based on the inverse matrix W. The reliability may be defined in terms of SNR (Signal-to-Noise Ratio), SINR (Signal-to-Interference and Noise Ratio), or the like. For example, where an inverse matrix of the ZF algorithm is used, and where the elements of the inverse matrix W are $w_{1,1}$, $w_{1,2}$, $w_{2,1}$ and $w_{2,2}$ the reliability $q_{1,y}$ for signals from the transmitter antenna #1 and the reliability $q_{2,y}$ for signals from the transmitter antenna #2 may be defined as shown in Expressions (15) and (16) below. FIG. 7 illustrates the reliability output.

$$q_{1,y}=1/(|w_{1,1}|^2+|w_{1,2}|^2) \quad (15)$$

$$q_{2,y}=1/.(|w_{2,1}|^2+|w_{2,2}|^2) \quad (16)$$

With the MMSE algorithm, SINR may be used, since the interfering component is not completely canceled. For example, using the inverse matrix W obtained by the MMSE algorithm from the propagation matrix H, the reliabilities $q_{1,y}$ and $q_{2,y}$ can be defined as shown in Expressions (17) and (18) below.

$$q_{1,y}=|(w_{1,1}\times h_{1,1}+w_{1,2}\times h_{2,1})/(1-w_{1,1}\times h_{1,1}+w_{1,2}\times h_{2,1})| \quad (17)$$

$$q_{2,y}=|(w_{2,1}\times h_{1,2}+w_{2,2}\times h_{2,2})/(1-w_{2,1}\times h_{1,2}+w_{2,2}\times h_{2,2})| \quad (18)$$

The reliability may be obtained based on the determinant or the eigenvalue of the propagation matrix H. Depending on the condition of the propagation matrix H, there may be cases where the inverse matrix cannot be obtained and the signals cannot be separated from one another. For example, if the determinant of the propagation matrix H is "0", it is not possible to obtain the inverse matrix of the propagation matrix H. In such a case, the reliability after separation can be assumed to be "0". Alternatively, the reliability may be assumed to be lower as the determinant is smaller. For example, with the ZF algorithm, the reliability may be obtained based on the determinant of $H^H H$. If the propagation matrix H can be converted, by eigenvalue decomposition, to a diagonal matrix whose diagonal elements are the eigenvalue, it means that the received signal is a signal obtained by multiplying the transmit signal by the eigenvalue, whereby the eigenvalue may be used as the reliability.

Figure 8:
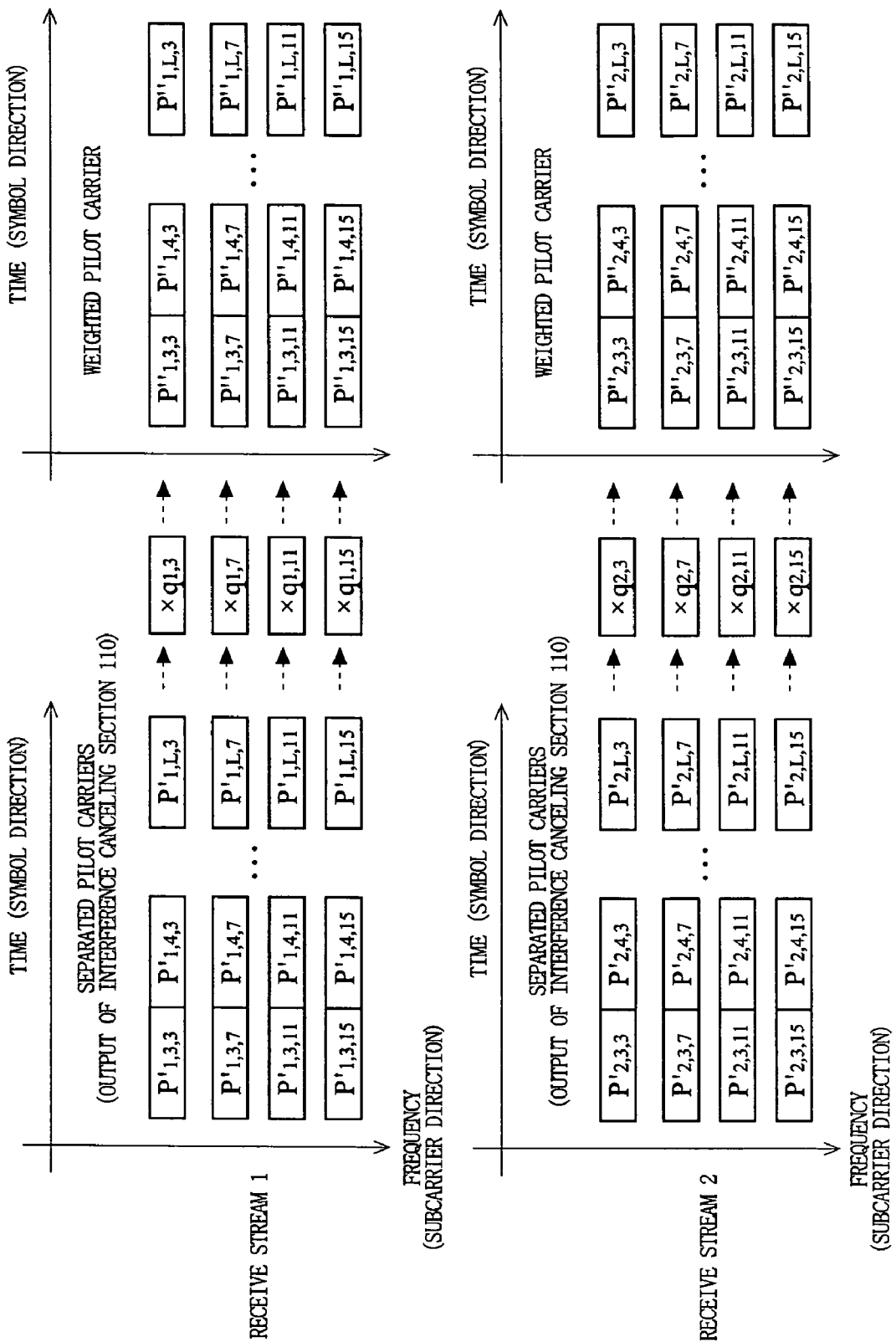
FIGS. 8 and 9 illustrate the process performed by a weighted calculation section 112.
Figure 9:
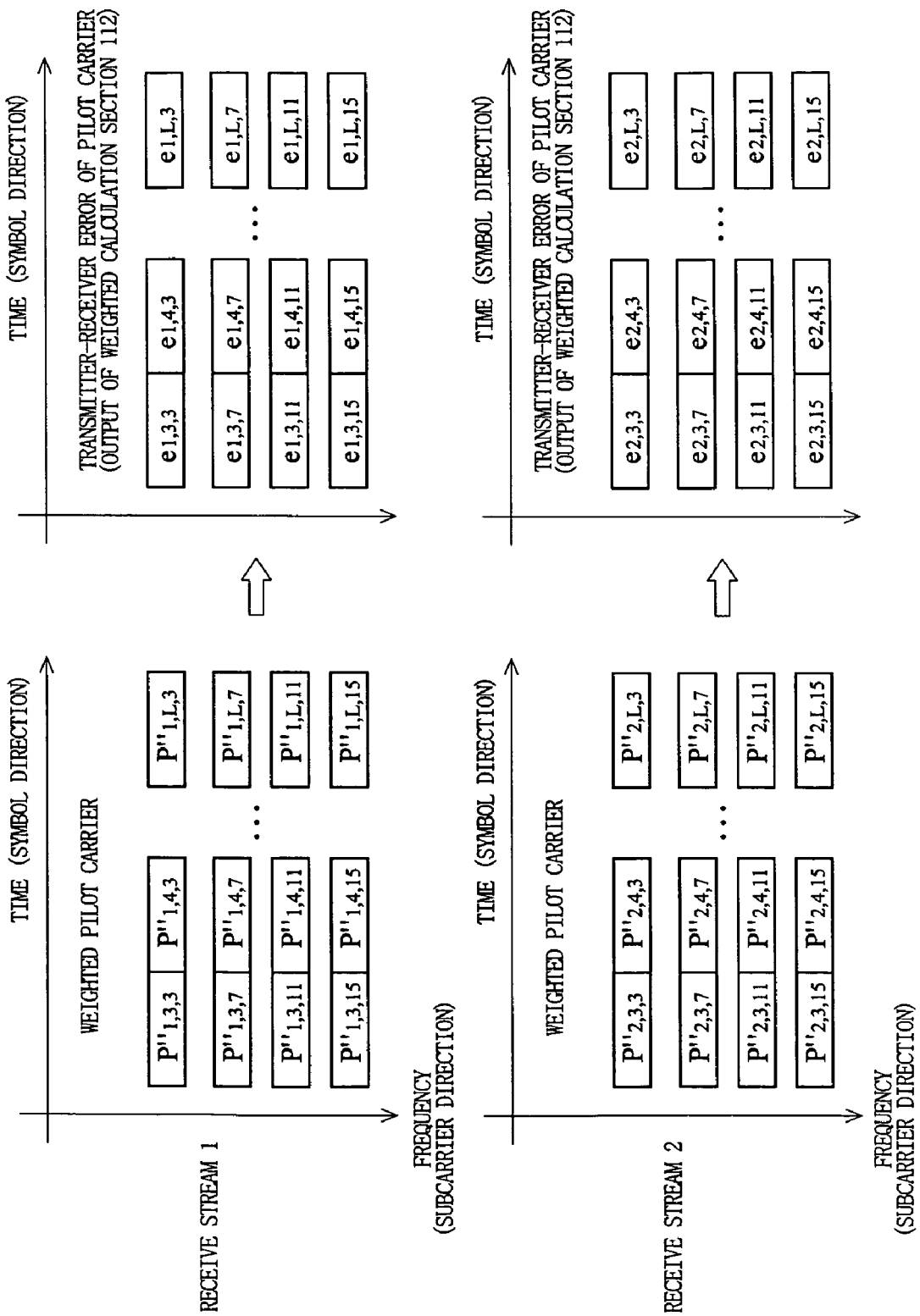

The weighted calculation section 112 selects a particular one or particular ones of the separated subcarriers $TSC'_{i,x,y}$ (typically a pilot carrier(s)), and weights the selected particular subcarrier(s) based on the reliability $q_{i,y}$ obtained by the reliability calculating section 111. Then, the difference between the weighted particular subcarrier and the known particular subcarrier is obtained, and the transmitter-receiver error $e_{i,x,y}$ is estimated. For example, where the separated subcarriers $TSC'_{i,x,y}$ where y=3, 7, 11 and 15 are pilot carriers $P'_{i,x,y}$ and the reliability $q_{i,y}$ is represented in terms of SNR, the weighted pilot carrier $P''_{i,x,y}$ and the transmitter-receiver error $e_{i,x,y}$ are expressed as shown in Expressions (19) and (20) below. FIGS. 8 and 9 each illustrate the weighted receive stream.

$$P''_{i,x,y}=P'_{i,x,y}\times q_{i,y} \quad (19)$$

$$e_{i,x,y}=P''_{i,x,y}/P_{i,x,y} \quad (20)$$

The meaning of the weighting process will now be described with reference to FIG. 10.

Figure 10A:
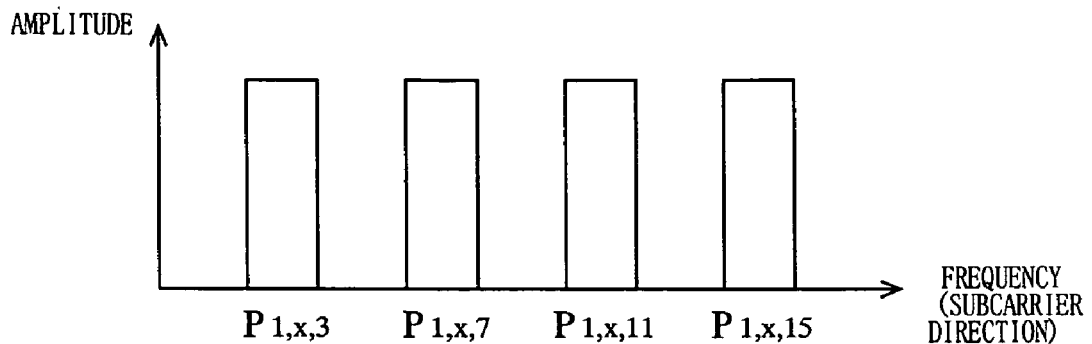
FIGS. 10A to 10D illustrate the meaning of a weighting process.
Figure 10B:
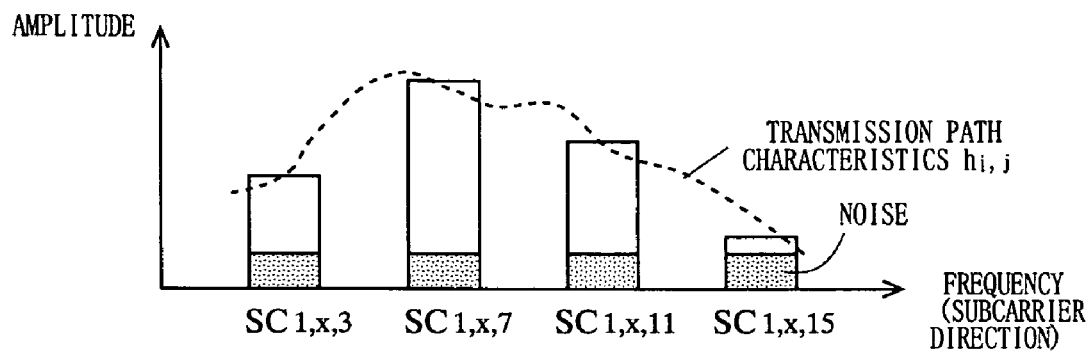
Figure 10C:
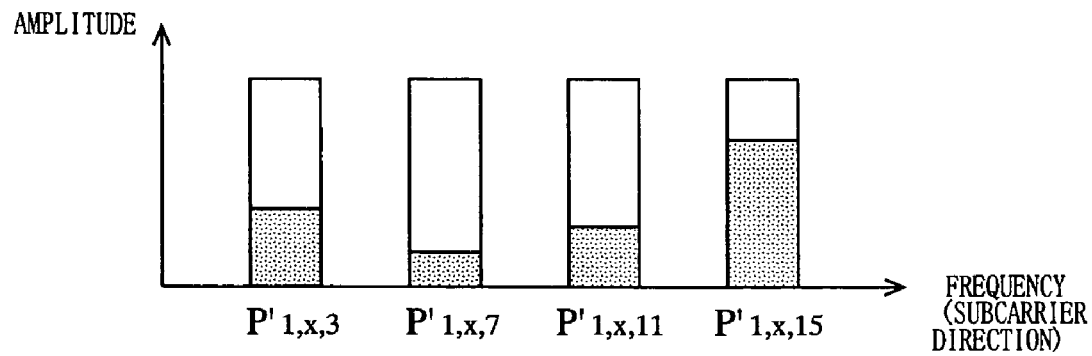
Figure 10D:
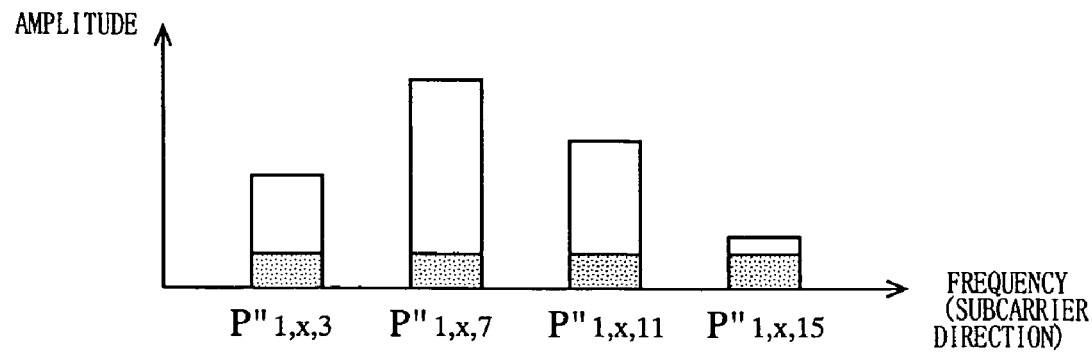

The pilot carriers $P_{i,x,y}$ (FIG. 10A) are transmitted from the OFDM transmitter side with a predetermined amplitude and a predetermined phase, and the amplitude and the phase are varied by the transmission path characteristics $h_{j,i}$ and noise is added to the pilot carriers $P_{i,x,y}$ due to variations in the reception level (FIG. 10B). Therefore, if the amplitude and the phase are normalized while eliminating the transmission path characteristics $h_{j,i}$ component by using the inverse matrix calculation, the noise components will vary between the separated pilot carriers $P'_{i,x,y}$ due to the inverse matrix reliability error, the receiver error, or the like (FIG. 10C). In view of this, the amplitude of the separated pilot carrier $P'_{i,x,y}$ is weighted with the reliability of the inverse matrix $W_y$. Thus, it is possible to realize a normalization operation capable of making uniform the noise components contained in the pilot carriers (FIG. 10D).

Figure 11:
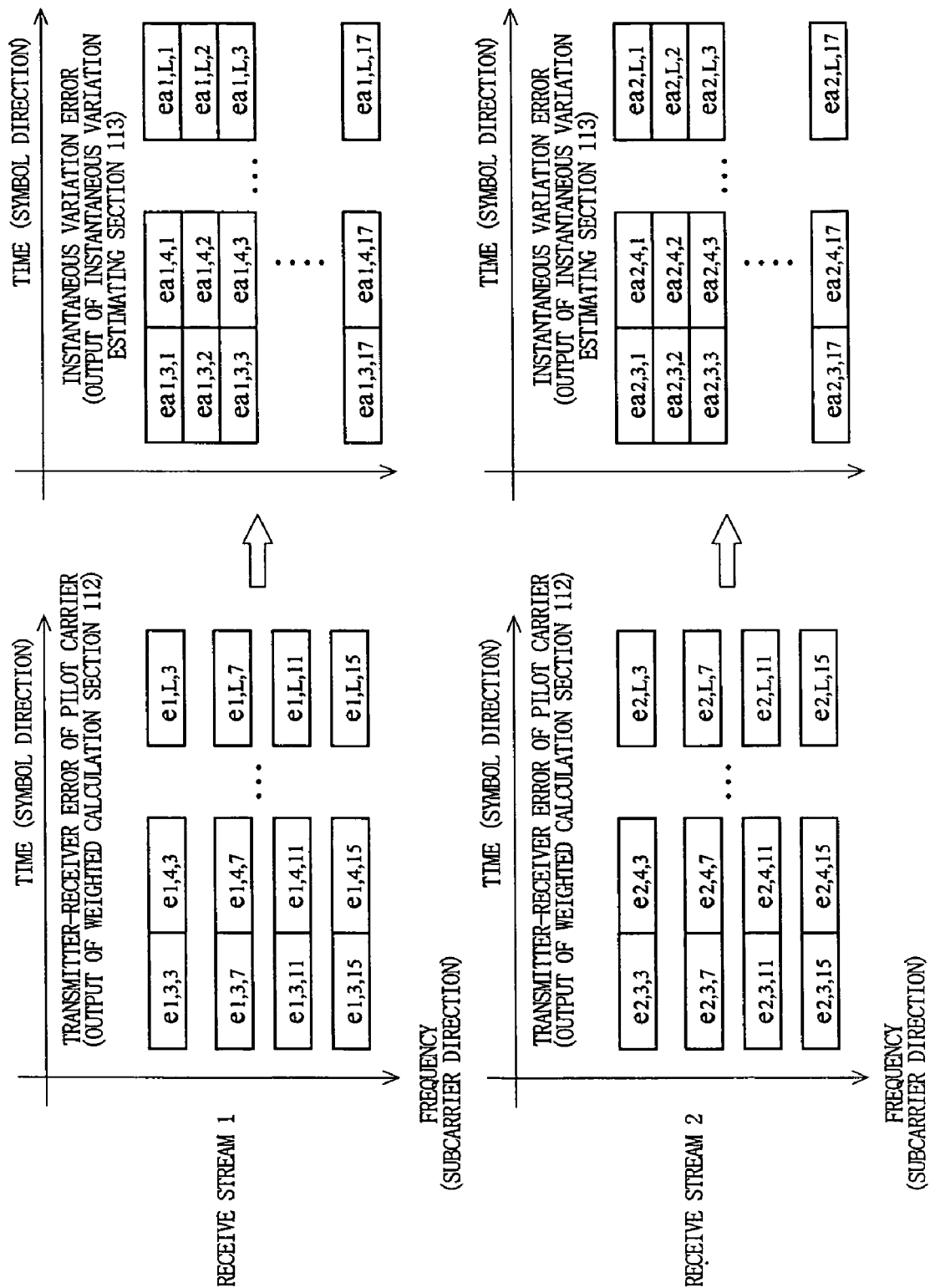
FIG. 11 illustrates the process performed by an instantaneous variation estimating section 113.

The instantaneous variation estimating section 113 estimates an instantaneous variation error ea of each data symbol based on the transmitter-receiver error $e_{i,x,y}$ of each weighted pilot carrier. The instantaneous variation error ea may be a phase rotation due to the phase noise occurring commonly to all the subcarriers in the symbol or a remaining frequency error due to the carrier wave frequency estimation error, or the like. For example, the weighted average of the estimated transmitter-receiver errors for each symbol of each stream is used as an instantaneous variation error $ea_{i,x,y}$ for all the subcarriers in that symbol. The instantaneous variation error $ea_{i,x,y}$ can be obtained as shown in Expression (21) below. FIG. 11 illustrates the instantaneous variation error.

$$ea_{i,x,y}=(e_{i,x,3}+e_{i,x,7}+e_{i,x,11}+e_{i,x,15})/4 \quad (21)$$

Based on the instantaneous variation error $ea_{i,x,y}$ of each symbol, the carrier correcting section 114 corrects each separated subcarrier $TSC'_{i,x,y}$. For example, a data carrier $D''_{i,x,y}$ may be corrected to $D''_{i,x,y}/ea_{i,x,y}$. The corrected data carrier is demodulated into transmit data through the data demodulating section 115.

As described above, with the OFDM receiving method and the OFDM receiver of the first embodiment of the present invention, pilot carriers are weighted based on the reliability of the inverse matrix of the propagation coefficient. Thus, it is possible to suppress the estimation error due to noise emphasis, and to accurately detect the transmitter-receiver error. Moreover, the separated data carrier is corrected based on the instantaneous variation of the detected transmitter-receiver error. Thus, it is possible to reduce the demodulation error.

Second Embodiment

Figure 12:
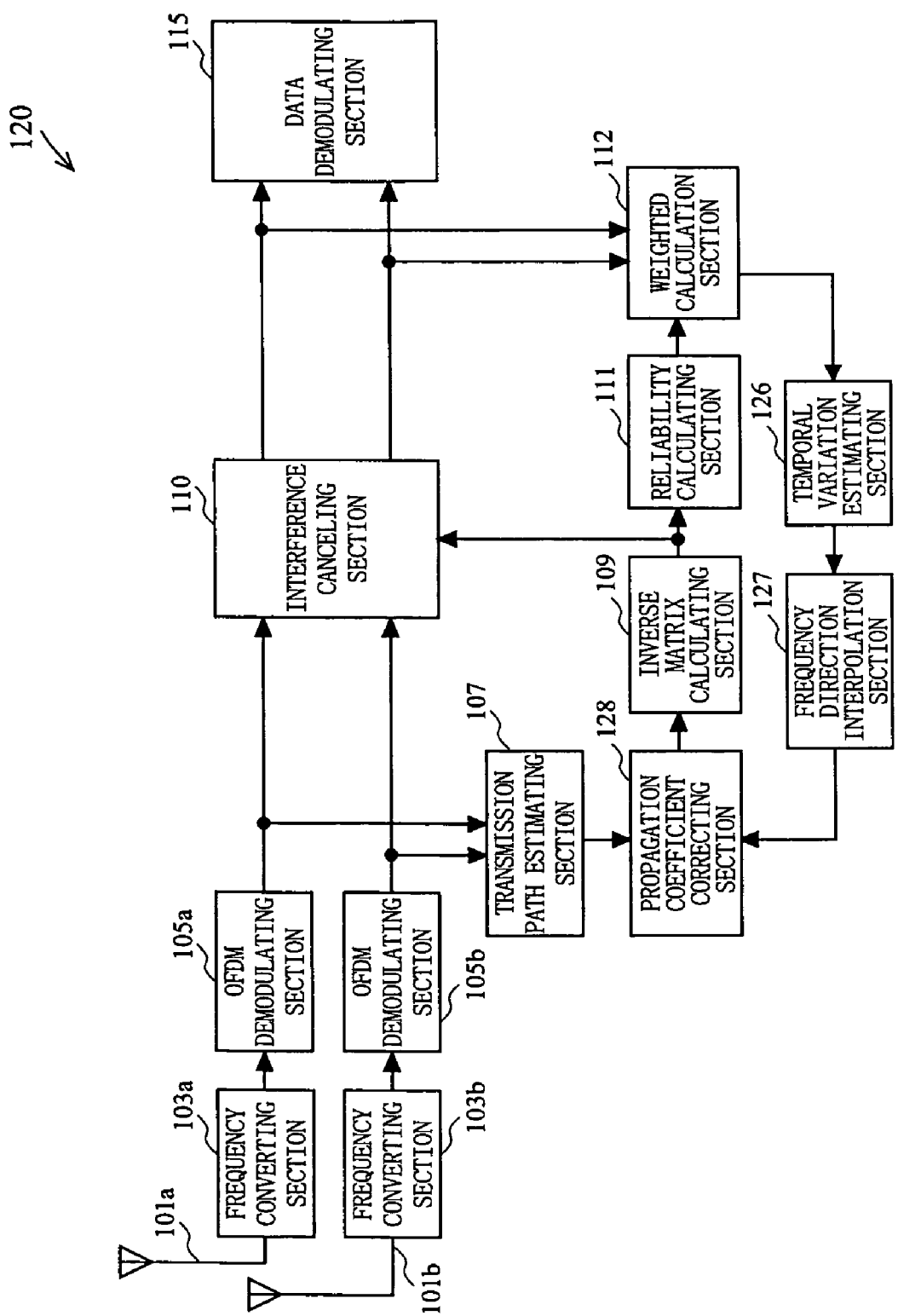
FIG. 12 is a block diagram showing a configuration of an OFDM receiver 120 according to a second embodiment of the present invention.

FIG. 12 is a block diagram showing a configuration of an OFDM receiver 120 according to a second embodiment of the present invention. Referring to FIG. 12, the OFDM receiver 120 of the second embodiment includes the receiver antennas 101a and 101b, the frequency converting sections 103a and 103b, the OFDM demodulating sections 105a and 105b, the transmission path estimating section 107, a propagation coefficient correcting section 128, the inverse matrix calculating section 109, the interference canceling section 110, the reliability calculating section 111, the weighted calculation section 112, a temporal variation estimating section 126, a frequency direction interpolation section 127, and the data demodulating section 115.

As shown in FIG. 12, the OFDM receiver 120 of the second embodiment includes the temporal variation estimating section 126, the frequency direction interpolation section 127 and the propagation coefficient correcting section 128, instead of the instantaneous variation estimating section 113 and the carrier correcting section 114 of the OFDM receiver 100 of the first embodiment. Otherwise, the elements of the OFDM receiver 120 of the second embodiment are similar to those of the OFDM receiver 100 of the first embodiment, and will be denoted by the same reference numerals and will not be further described below.

The operation of various elements of the OFDM receiver 120 and the OFDM receiving method performed by the OFDM receiver 120 will now be described.

Figure 13:
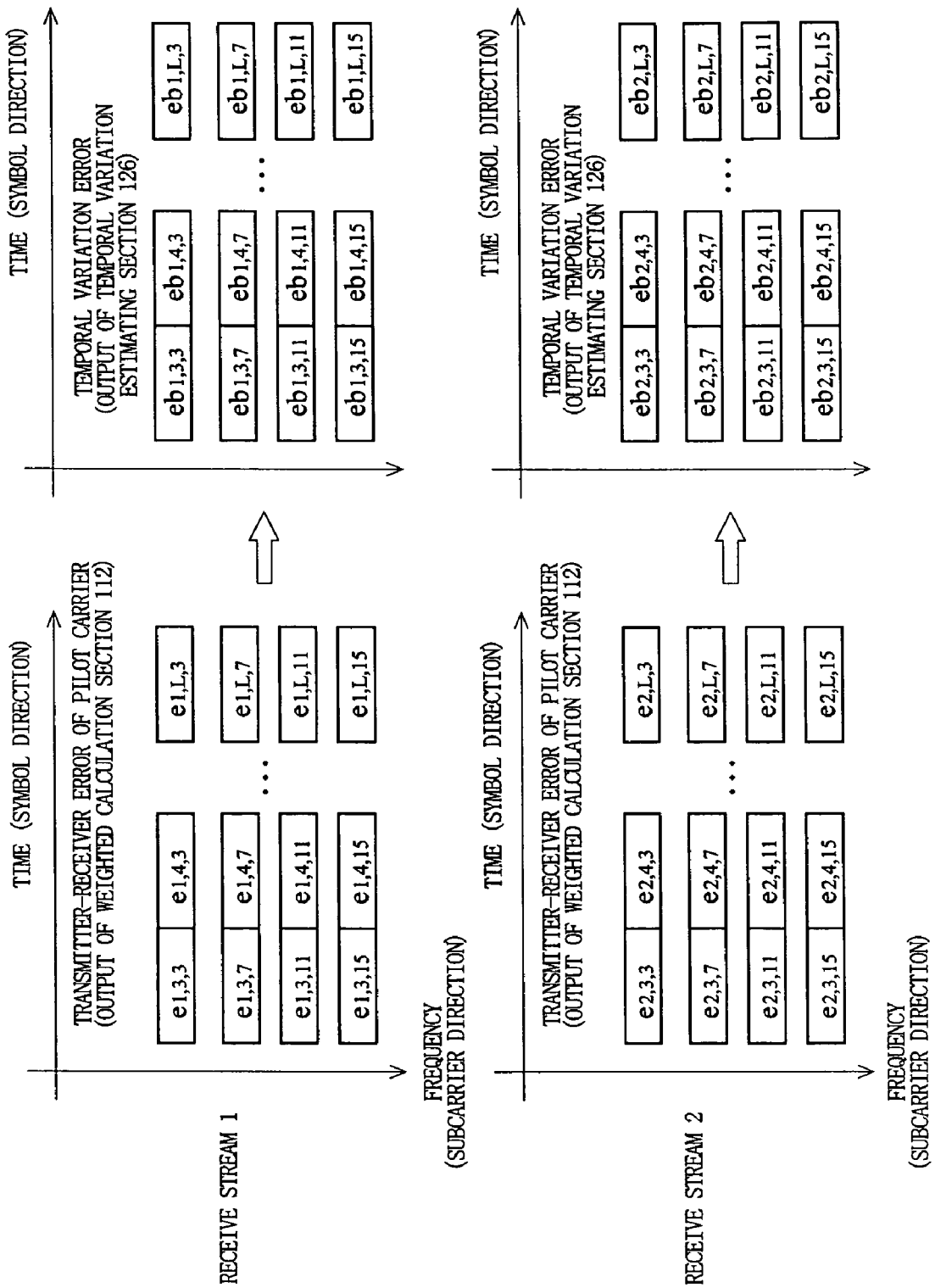
FIG. 13 illustrates the process performed by a temporal variation estimating section 126.

The temporal variation estimating section 126 estimates a temporal variation error eb of each data symbol from the transmitter-receiver error $e_{i,x,y}$ of each weighted pilot carrier. The temporal variation error eb may be a phase error due to a clock frequency error or an error due to a transmission path variation. While the variation is gentle, it differs from one subcarrier to another. Therefore, it is possible to estimate the temporal variation error eb by, for example, averaging the pilot carriers in the symbol direction (time direction). A temporal variation error $eb_{i,x,y}$ of each pilot carrier (y=3, 7, 11, 15) can be obtained as shown in Expression (22) below. FIG. 13 illustrates the temporal variation error among pilot carriers.

The period k over which the average is taken may be appropriately determined based on the status of the temporal variation.

$$eb_{i,x,y}=(e_{i,x,y}+e_{i,x-1,y}+e_{i,x-2,y}+\ldots+e_{i,x-k,y})/k \quad (22)$$

Figure 14:
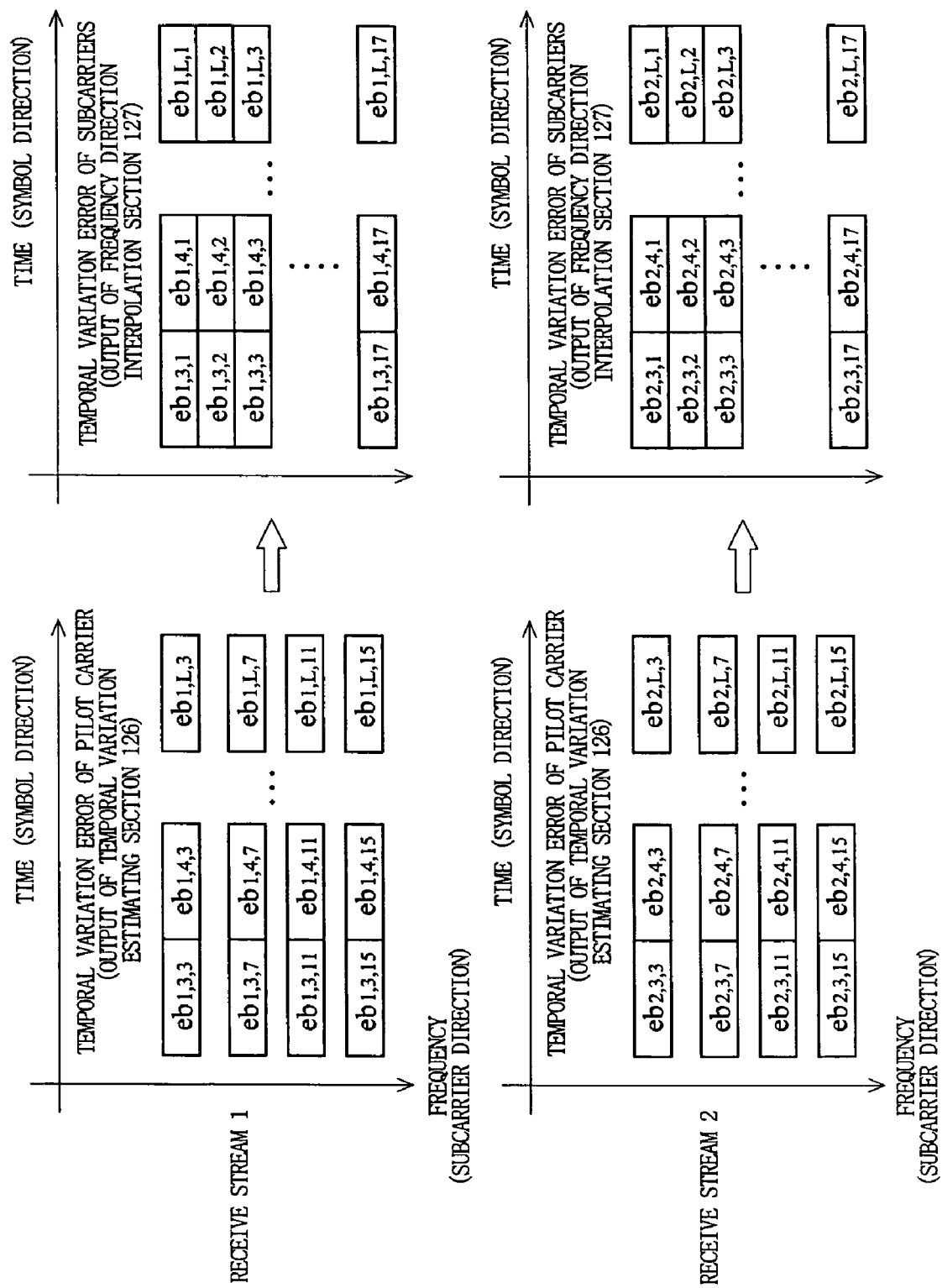
FIG. 14 illustrates the process performed by a frequency direction interpolation section 127.

The frequency direction interpolation section 127 interpolates (by linear interpolation, least squares interpolation, spline interpolation, etc.) in the frequency direction or averages the temporal variation errors $eb_{i,x,y}$ (y=3, 7, 11, 15) obtained for each pilot carrier, to thereby estimate the temporal variation error $eb_{i,x,y}$ for each data carrier. For example, where the averaging process is performed, the temporal variation error $eb_{i,x,y}$ for each data carrier can be obtained as shown in Expression (23) below. FIG. 14 illustrates the temporal variation error among data carriers.

$$eb_{i,x,y}=(eb_{i,x,3}+eb_{i,x,7}+eb_{i,x,11}+eb_{i,x,15})/4 \quad (23)$$

The propagation coefficient correcting section 128 corrects the propagation coefficient $h_{j,i}$, which is estimated by the transmission path estimating section 107, with the temporal variation error $eb_{i,x,y}$, thereby obtaining the corrected propagation coefficient $h'_{j,i}$. In this example, the propagation coefficient $h_{j,i,y}$ for each subcarrier is multiplied by the temporal variation error $eb_{i,x,y}$ as shown in Expression (24) to obtain the corrected propagation coefficient $h'_{j,i,y}$.

$$h'_{j,i,y}=h_{j,i,y} \times eb_{i,x,y} \quad (24)$$

As described above, with the OFDM receiving method and the OFDM receiver of the second embodiment of the present invention, the pilot carrier is weighted with the reliability of the inverse matrix of the propagation coefficient. Thus, it is possible to suppress the estimation error due to noise emphasis, and to accurately detect the transmitter-receiver error. Moreover, the inverse matrix is obtained after correcting the estimated propagation coefficient based on the temporal variation of the detected transmitter-receiver error. Thus, it is possible to follow the variations in the propagation path and to improve the precision of the signal separation by the inverse matrix multiplication.

Third Embodiment

Figure 15:
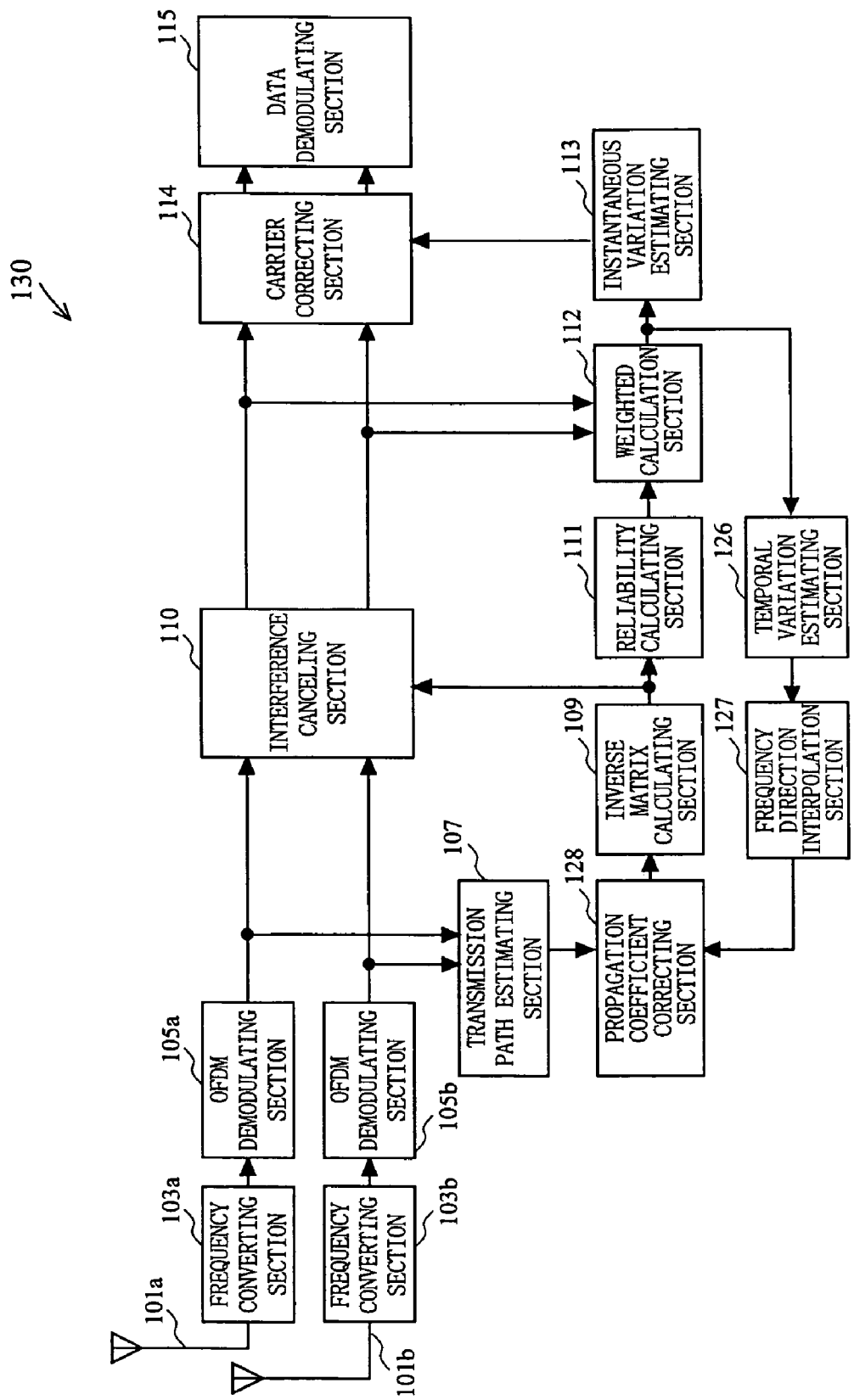
FIG. 15 is a block diagram showing a configuration of an OFDM receiver 130 according to a third embodiment of the present invention.

FIG. 15 is a block diagram showing a configuration of an OFDM receiver 130 according to a third embodiment of the present invention. Referring to FIG. 15, the OFDM receiver 130 of the third embodiment includes the receiver antennas 101a and 101b, the frequency converting sections 103a and 103b, the OFDM demodulating sections 105a and 105b, the transmission path estimating section 107, the propagation coefficient correcting section 128, the inverse matrix calculating section 109, the interference canceling section 110, the reliability calculating section 111, the weighted calculation section 112, the instantaneous variation estimating section 113, the carrier correcting section 114, the temporal variation estimating section 126, the frequency direction interpolation section 127, and the data demodulating section 115.

The OFDM receiver 130 of the third embodiment includes both the configuration for correcting the instantaneous variation component ea as described above in the first embodiment and the configuration for correcting the temporal variation component eb as described above in the second embodiment.

Thus, with the OFDM receiving method and the OFDM receiver of the third embodiment of the present invention, separated data carriers are corrected based on the instantaneous variation of the transmitter-receiver error, whereby it is possible to reduce the demodulation error. Moreover, the inverse matrix is obtained after correcting the estimated propagation coefficient based on the temporal variation of the detected transmitter-receiver error, whereby it is possible to follow the variations in the propagation path and to improve the precision of the signal separation by the inverse matrix multiplication.

Fourth Embodiment

Figure 16:
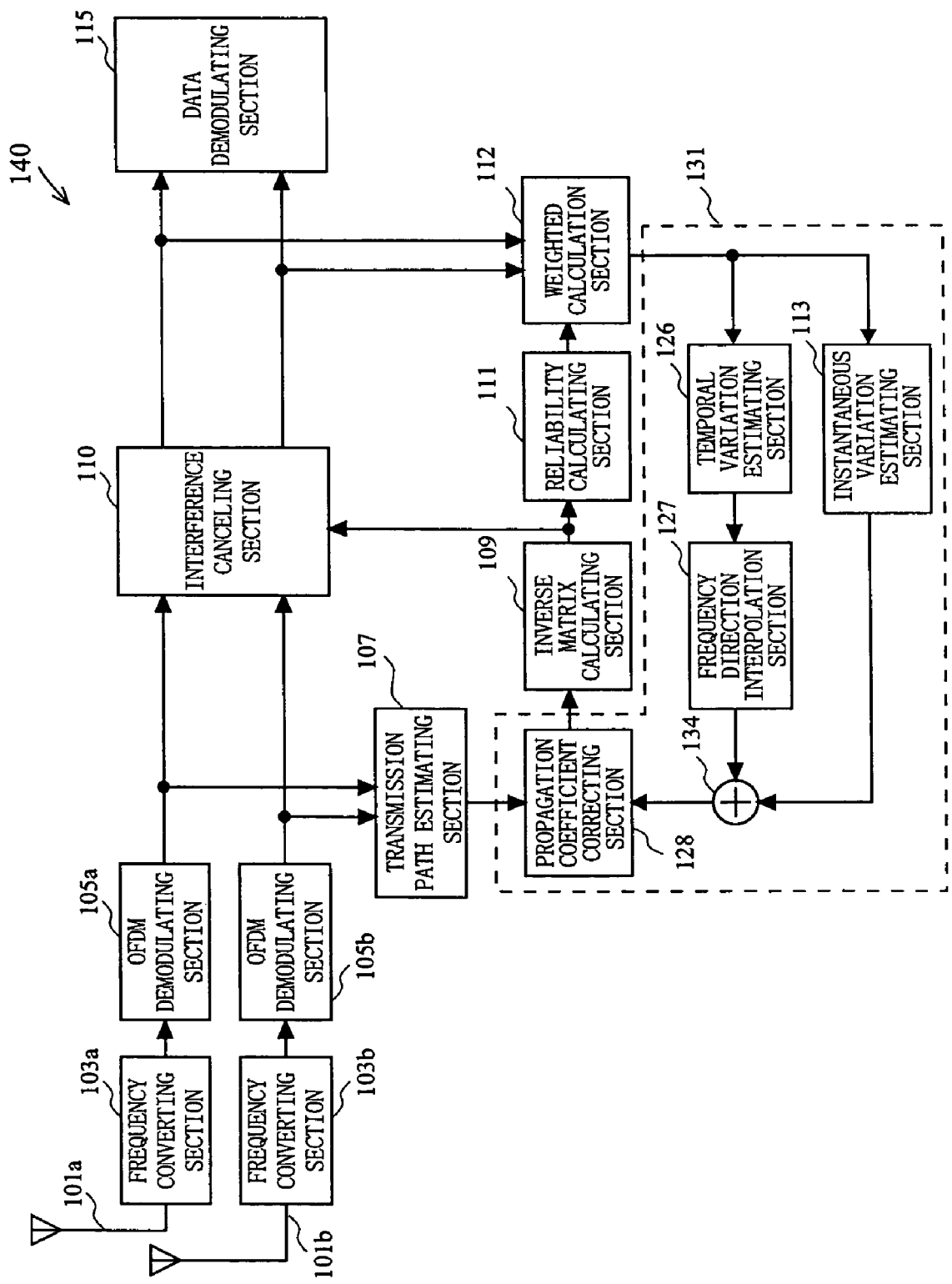
FIG. 16 is a block diagram showing a configuration of an OFDM receiver 140 according to a fourth embodiment of the present invention.

FIG. 16 is a block diagram showing a configuration of an OFDM receiver 140 according to a fourth embodiment of the present invention. Referring to FIG. 16, the OFDM receiver 140 of the fourth embodiment includes the receiver antennas 101a and 101b, the frequency converting sections 103a and 103b, the OFDM demodulating sections 105a and 105b, the transmission path estimating section 107, the inverse matrix calculating section 109, the interference canceling section 110, the reliability calculating section 111, the weighted calculation section 112, a variation estimating section 131, and the data demodulating section 115. The variation estimating section 131 includes the instantaneous variation estimating section 113, the temporal variation estimating section 126, the frequency direction interpolation section 127, a calculation section 134, and the propagation coefficient correcting section 128.

While the OFDM receiver 130 of the third embodiment corrects the instantaneous variation error ea for data carriers $D''_{i,x,y}$ of each receive stream, the OFDM receiver 140 of the fourth embodiment corrects the propagation coefficient $h_{j,i,y}$ and then obtains the inverse matrix W and divides the received signal into receive streams, thus correcting the instantaneous variation error ea.

When performing interference cancellation for data symbols, the interference canceling section 110 first separates receive pilot carriers $P'_{j,x,y}$. Then, the interference canceling section 110 obtains the inverse matrix $W_y$ from the propagation coefficient $h_{j,i,y}$ for each subcarrier of the receive pilot carrier, and performs interference cancellation for the receive pilot carrier. Then, using the separated pilot carrier $P''_{i,x,y}$, the instantaneous variation error $ea_{i,x,y}$ and the temporal variation error $eb_{i,x,y}$ are obtained as described above in the first embodiment, based on which the propagation coefficient $h_{j,i,y}$ is corrected. Then, the interference canceling section 110 obtains the inverse matrix of the data carriers based on the corrected propagation coefficient $h'_{j,i,y}$, and performs interference cancellation for the receive data carriers $D'_{j,x,y}$, thereby obtaining separated data carriers $D''_{i,x,y}$ for each stream.

As described above, with the OFDM receiving method and the OFDM receiver of the fourth embodiment of the present invention, the inverse matrix is obtained after updating the propagation coefficient for each symbol. Therefore, it is possible to reduce the inverse matrix calculation error or the interference cancellation error due to the propagation coefficient estimation error, whereby it is possible to more accurately separate streams from one another.

Fifth Embodiment

Figure 17:
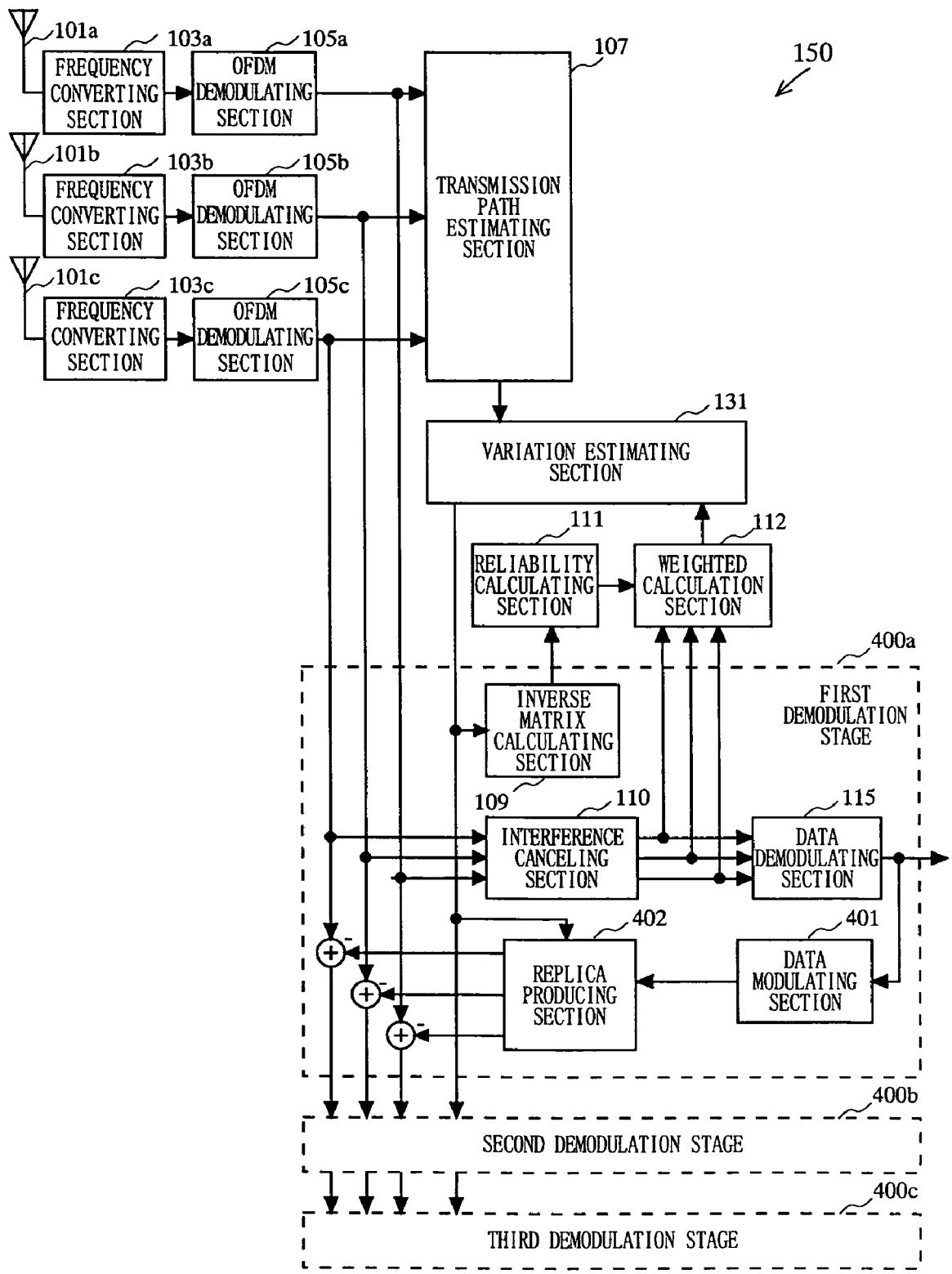
FIG. 17 is a block diagram showing a configuration of an OFDM receiver 150 according to a fifth embodiment of the present invention.

FIG. 17 is a block diagram showing a configuration of an OFDM receiver 150 according to a fifth embodiment of the present invention. Referring to FIG. 17, the OFDM receiver 150 of the fifth embodiment includes the receiver antennas 150a to 101c, frequency converting sections 103a to 103c, the OFDM demodulating sections 105a to 105c, the transmission path estimating section 107, the reliability calculating section 111, the weighted calculation section 112, the variation estimating section 131, and demodulation stages 400a to 400c. The demodulation stages 400a to 400c each include the inverse matrix calculating section 109, the interference canceling section 110, the data demodulating section 115, a data modulating section 401, and a replica producing section 402.

As shown in FIG. 17, the OFDM receiver 150 of the fifth embodiment differs from those of the preceding embodiments in that each of the demodulation stages 400a to 400c further includes the data modulating section 401 and the replica producing section 402, in addition to the inverse matrix calculating section 109, the interference canceling section 110 and the data demodulating section 115. In the OFDM receiver 150 of the fifth embodiment, elements other than the data modulating section 401 and the replica producing section 402 are similar to those described above in the preceding embodiments, and those elements will be denoted by the same reference numerals and fill not be further described below.

In the fifth embodiment, there are provided a number of demodulation stages according to the number of streams that are multiplexed into the transmit signal. As for the receiving performance improving function based on the instantaneous variation and the temporal variation of the transmitter-receiver error, a configuration shared among the plurality of demodulation stages is employed. The operation performed by the OFDM receiver 150 will now be described, assuming a case where signals obtained by multiplexing three streams together are received by three antennas.

First, the first demodulation stage 400a separates three streams multiplexed together in each receive signal by using the inverse matrix of the propagation matrix. One of the three separated streams having the highest reliability is selected, and a replica signal of the selected stream included in each receive signal is produced by using the propagation matrix. For example, the reliability may be defined in terms of SNR, SINR, the presence/absence of a demodulation error, etc. The produced replica signal is subtracted from the receive signals, thereby removing the selected stream component.

Then, the next, second demodulation stage 400b can separate two stream from each receive signal since one stream has already been removed in the first demodulation stage 400a. Then, a replica signal of one of the two separated streams having the highest reliability is produced, and the produced replica signal is subtracted from the receive signals, thereby removing the stream component.

Then, the last, third demodulation stage 400c can separate the remaining one stream from each receive signal since two streams have already been removed in the first and second demodulation stages 400a and 400b. Through this process, it is possible to improve the receiver SNR.

This effect will now be described in detail. The first demodulation stage 400a separates three streams from each receive signal, as in the third embodiment. The transmitter-receiver error is estimated by using the pilot carrier $P''_{i,x,y}$ of each stream, and $h'_{j,i,y}$ to be corrected is determined so that the propagation coefficient $h_{j,i,y}$ will follow the transmitter-receiver error. The data demodulating section 115 demodulates the separated three streams and obtains the transmit data. Then, the data demodulating section 115 selects, of the three streams, a stream i having the highest reliability, and outputs the transmit data of the stream i as the demodulation result of the first demodulation stage 400a. The data modulating section 401 re-modulates the transmit data outputted by the data demodulating section 115 to produce subcarriers $D_{ri,x,y}$ and $P_{ri,x,y}$.

The replica producing section 402 multiplies each subcarrier of the stream i re-modulated by the data modulating section 401 by the corrected propagation coefficient $h'_{j,i,y}$, and produces a replica signal of the stream i for each receiver antenna j. For example, the replica data carrier $RD_{j,x,y}$ and the replica pilot carrier $RP_{j,x,y}$ can be expressed as shown in Expressions (25) and (26) below.

$$RD_{j,x,y}=h'_{j,i,y} \times D_{ri,x,y} \quad (25)$$

$$RP_{j,x,y}=h'_{j,i,y} \times P_{ri,x,y} \quad (26)$$

The produced replica data carrier $RD_{j,x,y}$ and the produced replica pilot carrier $RP_{j,x,y}$ are subtracted from the receive subcarriers $D'_{j,x,y}$ and $P'_{j,x,y}$, thereby obtaining the receive subcarrier of the second demodulation stage 400b (see Expressions (27) and (28) below).

$$D'_{j,x,y}=D'_{j,x,y}-RD_{j,x,y} \quad (27)$$

$$P'_{j,x,y}=P'_{j,x,y}-RP_{j,x,y} \quad (28)$$

Thus, all the streams i are separated and demodulated by successively performing the processes through the second and third demodulation stages 400b and 400c.

As described above, with the OFDM receiving method and the OFDM receiver of the fifth embodiment of the present invention, the propagation coefficient is updated so as to follow the variations in the transmitter-receiver error and the transmission path, whereby it is possible to improve the precision of the replica signal. Thus, it is possible to reduce the error occurring when removing a replica signal from a receive signal, whereby it is possible to more accurately separate streams. Moreover, it is no longer necessary to perform error correction for the stream separated for each demodulation stage, whereby it is possible to reduce the computational cost and the circuit scale.

Note that the present invention can be used not only for receiving and separating MIMO signals but also for suppressing interfering signals when the receiver receives an independent OFDM signal mixed with interfering signals or MIMO signals mixed with interfering signals.

In a case where the present invention is used for suppressing interfering signals, e.g., where an inverse matrix W is obtained from a propagation matrix H by using the MMSE algorithm, the inverse matrix W can be obtained as $W=(H^*H^T+R_{uu})^{-1}H^*$ using the inter-antenna covariance matrix $R_{uu}$ instead of zI. Any of various methods described above can be used for the process of correcting an error based on the pilot carrier.

All or some of the functional blocks of the OFDM receivers of the first to fifth embodiments of the present invention are typically each implemented in the form of an LSI being an integrated circuit (named "IC", "system LSI", "super LSI" or "ultra LSI" depending on the degree of integration). These functional blocks may be individually formed into a separate chip, or some or all of them may be formed together into a single chip.

Moreover, the form of an integrated circuit that can be used with the present invention is not limited to an LSI, but may alternatively be a dedicated circuit or a general-purpose processor. It may alternatively be an FPGA (Field Programmable Gate Array) being programmable after the LSI is manufactured, or a reconfigurable processor in which the interconnections and settings of circuit cells in the LSI can be reconfigured. The calculations of these functional blocks may be performed by using a DSP, a CPU, etc., for example. These process steps may be provided in the form of a program or programs stored in a storage medium to be executed to perform these process steps.

Furthermore, if advancements in the semiconductor technology or derivative technologies bring forth a new form of circuit integration replacing LSIs, the new form of circuit integration can of course be used for the integration of the functional blocks. Such a derivative technology may possibly be an application of biotechnology, for example.

While the invention has been described in detail, the foregoing description is in all aspects illustrative and not restrictive. It is understood that numerous other modifications and variations can be devised without departing from the scope of the invention.

What is claimed is:

1. An OFDM receiving method for receiving an OFDM signal via a plurality of space paths using a plurality of receiver antennas, the OFDM signal being transmitted from at least one transmitter antenna and including a plurality of subcarriers orthogonal to each other, the subcarriers including a data carrier which is assigned transmit data and a pilot carrier which is assigned a known phase and a known amplitude, the method comprising:

OFDM-demodulating each of the OFDM signals received by the plurality of receiver antennas into a plurality of receive subcarriers;

estimating propagation coefficients of the plurality of space paths based on the plurality of receive subcarriers;

calculating an inverse matrix of a propagation matrix whose elements are the estimated propagation coefficients;

performing interference cancellation for the plurality of receive subcarriers by using the inverse matrix, and estimating transmit subcarriers multiplexed in space;

calculating a reliability of the inverse matrix;

extracting the pilot carrier from the estimated transmit subcarriers, and weighting the extracted pilot carrier according to the reliability; and correcting an error included in the plurality of receive subcarriers based on the weighted pilot carrier, wherein the correcting step includes:

a step of estimating a temporal variation of a demodulation error of a pilot carrier by using the weighted pilot carrier;

a step of estimating a temporal variation of the demodulation error for each subcarrier by interpolating the estimated temporal variation in a frequency direction; and a step of correcting the estimated propagation coefficients based on the estimated temporal variation of the demodulation error for each subcarrier.

2. An OFDM receiving method for receiving an OFDM signal via a plurality of space paths using a plurality of receiver antennas, the OFDM signal being transmitted from at least one transmitter antenna and including a plurality of subcarriers orthogonal to each other, the subcarriers including a data carrier which is assigned transmit data and a pilot carrier which is assigned a known phase and a known amplitude, the method comprising:

OFDM-demodulating each of the OFDM signals received by the plurality of receiver antennas into a plurality of receive subcarriers;

estimating propagation coefficients of the plurality of space paths based on the plurality of receive subcarriers;

calculating an inverse matrix of a propagation matrix whose elements are the estimated propagation coefficients;

performing interference cancellation for the plurality of receive subcarriers by using the inverse matrix, and estimating transmit subcarriers multiplexed in space;

calculating a reliability of the inverse matrix;

extracting the pilot carrier from the estimated transmit subcarriers, and weighting the extracted pilot carrier according to the reliability; and correcting an error included in the plurality of receive subcarriers based on the weighted pilot carrier, wherein the correcting step includes:

a step of estimating an instantaneous variation of a demodulation error by using the weighted pilot carrier;

a step of correcting the estimated transmit subcarriers according to the estimated instantaneous variation of the demodulation error;

a step of estimating a temporal variation of a demodulation error of a pilot carrier by using the weighted pilot carrier;

a step of estimating a temporal variation of the demodulation error for each subcarrier by interpolating the estimated temporal variation in a frequency direction; and a step of correcting the estimated propagation coefficients based on the estimated temporal variation of the demodulation error for each subcarrier.

3. An OFDM receiving method for receiving an OFDM signal via a plurality of space paths using a plurality of receiver antennas, the OFDM signal being transmitted from at least one transmitter antenna and including a plurality of subcarriers orthogonal to each other, the subcarriers including a data carrier which is assigned transmit data and a pilot carrier which is assigned a known phase and a known amplitude, the method comprising:

OFDM-demodulating each of the OFDM signals received by the plurality of receiver antennas into a plurality of receive subcarriers;

estimating propagation coefficients of the plurality of space paths based on the plurality of receive subcarriers;

calculating an inverse matrix of a propagation matrix whose elements are the estimated propagation coefficients;

performing interference cancellation for the plurality of receive subcarriers by using the inverse matrix, and estimating transmit subcarriers multiplexed in space;

calculating a reliability of the inverse matrix;

extracting the pilot carrier from the estimated transmit subcarriers, and weighting the extracted pilot carrier according to the reliability; and correcting an error included in the plurality of receive subcarriers based on the weighted pilot carrier, wherein the correcting step includes:

a step of estimating an instantaneous variation of a demodulation error by using the weighted pilot carrier;

a step of estimating a temporal variation of a demodulation error of a pilot carrier by using the weighted pilot carrier;

a step of estimating a temporal variation of the demodulation error for each subcarrier by interpolating the estimated temporal variation in a frequency direction; and a step of correcting the estimated propagation coefficients based on the estimated instantaneous variation of the demodulation error and the estimated temporal variation of the demodulation error for each subcarrier.

4. An OFDM receiving method for receiving an OFDM signal via a plurality of space paths using a plurality of receiver antennas, the OFDM signal being transmitted from a plurality of transmitter antennas and including a plurality of subcarriers orthogonal to each other, the subcarriers including a data carrier which is assigned transmit data and a pilot carrier which is assigned a known phase and a known amplitude, the method comprising:

a first step of OFDM-demodulating each of the OFDM signals received by the plurality of receiver antennas into a plurality of receive subcarriers;

a second step of estimating propagation coefficients of the plurality of space paths based on the plurality of receive subcarriers;

a third step of calculating an inverse matrix of a propagation matrix whose elements are the estimated propagation coefficients;

a fourth step of performing interference cancellation for the plurality of receive subcarriers by using the inverse matrix, and estimating transmit subcarriers multiplexed in space;

a fifth step of calculating a reliability of the inverse matrix;

a sixth step of extracting the pilot carrier from the estimated transmit subcarriers, and weighting the extracted pilot carrier according to the reliability; and a seventh step of estimating an instantaneous variation of a demodulation error and a temporal variation of the demodulation error for each estimated subcarrier based on the weighted pilot carrier, and correcting the estimated propagation coefficients based on the instantaneous variation and the temporal variation;

an eighth step of demodulating the estimated transmit subcarriers to obtain transmit data;

a ninth step of re-modulating the demodulated transmit data to produce a plurality of subcarriers;

a tenth step of multiplying the plurality of re-modulated subcarriers by the corrected propagation coefficients to produce a replica signal; and an eleventh step of producing a subtracted signal obtained by subtracting the replica signal from the plurality of receive subcarriers, wherein a loop process of performing the third to eleventh steps using the subtracted signal as a new set of receive subcarriers is repeated a number of times equal to the number of receive subcarriers.

5. An OFDM receiver for receiving an OFDM signal via a plurality of space paths using a plurality of receiver antennas, the OFDM signal being transmitted from at least one transmitter antenna and including a plurality of subcarriers orthogonal to each other, the subcarriers including a data carrier which is assigned transmit data and a pilot carrier which is assigned a known phase and a known amplitude, the receiver comprising:

a plurality of OFDM demodulating sections for OFDM-demodulating the OFDM signals received by the plurality of receiver antennas each into a plurality of receive subcarriers;

a transmission path estimating section for estimating propagation coefficients of the plurality of space paths based on the plurality of receive subcarriers;

an inverse matrix calculating section for calculating an inverse matrix of a propagation matrix whose elements are the estimated propagation coefficients;

an interference canceling section for performing interference cancellation for the plurality of receive subcarriers by using the inverse matrix, and estimating transmit subcarriers multiplexed in space;

a reliability calculating section for calculating a reliability of the inverse matrix;

a weighted calculation section for extracting the pilot carrier from the estimated transmit subcarriers, and weighting the extracted pilot carrier according to the reliability; and a variation estimating section for correcting an error included in the plurality of receive subcarriers based on the weighted pilot carrier, wherein the variation estimating section includes:

a temporal variation estimating section for estimating a temporal variation of a demodulation error of a pilot carrier by using the weighted pilot carrier;

a frequency direction interpolation section for estimating a temporal variation of the demodulation error for each subcarrier by interpolating the estimated temporal variation in a frequency direction; and a propagation coefficient correcting section for correcting the estimated propagation coefficients based on the estimated temporal variation of the demodulation error for each subcarrier.

6. An OFDM receiver for receiving an OFDM signal via a plurality of space paths using a plurality of receiver antennas, the OFDM signal being transmitted from at least one transmitter antenna and including a plurality of subcarriers orthogonal to each other, the subcarriers including a data carrier which is assigned transmit data and a pilot carrier which is assigned a known phase and a known amplitude, the receiver comprising:

a plurality of OFDM demodulating sections for OFDM-demodulating the OFDM signals received by the plurality of receiver antennas each into a plurality of receive subcarriers;

a transmission path estimating section for estimating propagation coefficients of the plurality of space paths based on the plurality of receive subcarriers;

an inverse matrix calculating section for calculating an inverse matrix of a propagation matrix whose elements are the estimated propagation coefficients;

an interference canceling section for performing interference cancellation for the plurality of receive subcarriers by using the inverse matrix, and estimating transmit subcarriers multiplexed in space;

a reliability calculating section for calculating a reliability of the inverse matrix;

a weighted calculation section for extracting the pilot carrier from the estimated transmit subcarriers, and weighting the extracted pilot carrier according to the reliability; and a variation estimating section for correcting an error included in the plurality of receive subcarriers based on the weighted pilot carrier, wherein the variation estimating section includes:

an instantaneous variation estimating section for estimating an instantaneous variation of a demodulation error by using the weighted pilot carrier;

a carrier correcting section for correcting the estimated transmit subcarriers according to the estimated instantaneous variation of the demodulation error;

a temporal variation estimating section for estimating a temporal variation of a demodulation error of a pilot carrier by using the weighted pilot carrier;

a frequency direction interpolation section for estimating a temporal variation of the demodulation error for each subcarrier by interpolating the estimated temporal variation in a frequency direction; and a propagation coefficient correcting section for correcting the estimated propagation coefficients based on the estimated temporal variation of the demodulation error for each subcarrier.

7. An OFDM receiver for receiving an OFDM signal via a plurality of space paths using a plurality of receiver antennas, the OFDM signal being transmitted from at least one transmitter antenna and including a plurality of subcarriers orthogonal to each other, the subcarriers including a data carrier which is assigned transmit data and a pilot carrier which is assigned a known phase and a known amplitude, the receiver comprising:

a plurality of OFDM demodulating sections for OFDM-demodulating the OFDM signals received by the plurality of receiver antennas each into a plurality of receive subcarriers;

a transmission path estimating section for estimating propagation coefficients of the plurality of space paths based on the plurality of receive subcarriers;

an inverse matrix calculating section for calculating an inverse matrix of a propagation matrix whose elements are the estimated propagation coefficients;

an interference canceling section for performing interference cancellation for the plurality of receive subcarriers by using the inverse matrix, and estimating transmit subcarriers multiplexed in space;

a reliability calculating section for calculating a reliability of the inverse matrix;

a weighted calculation section for extracting the pilot carrier from the estimated transmit subcarriers, and weighting the extracted pilot carrier according to the reliability; and a variation estimating section for correcting an error included in the plurality of receive subcarriers based on the weighted pilot carrier, wherein the variation estimating section includes:

an instantaneous variation estimating section for estimating an instantaneous variation of a demodulation error by using the weighted pilot carrier;

a temporal variation estimating section for estimating a temporal variation of a demodulation error of a pilot carrier by using the weighted pilot carrier;

a frequency direction interpolation section for estimating a temporal variation of the demodulation error for each subcarrier by interpolating the estimated temporal variation in a frequency direction; and a propagation coefficient correcting section for correcting the estimated propagation coefficients based on the estimated instantaneous variation of the demodulation error and the estimated temporal variation of the demodulation error for each subcarrier.

8. An OFDM receiver for receiving an OFDM signal via a plurality of space paths using a plurality of receiver antennas, the OFDM signal being transmitted from a plurality of transmitter antennas and including a plurality of subcarriers orthogonal to each other, the subcarriers including a data carrier which is assigned transmit data and a pilot carrier which is assigned a known phase and a known amplitude, the receiver comprising:

a plurality of OFDM demodulating sections for OFDM-demodulating the OFDM signals received by the plurality of receiver antennas each into a plurality of receive subcarriers;

a transmission path estimating section for estimating propagation coefficients of the plurality of space paths based on the plurality of receive subcarriers;

an equal number of demodulation stages to the number of receive subcarriers;

a reliability calculating section for calculating a reliability of an inverse matrix obtained in the plurality of demodulation stages;

a weighted calculation section for extracting the pilot carrier from the transmit subcarriers estimated in the plurality of demodulation stages, and weighting the extracted pilot carrier according to the reliability; and a variation estimating section for estimating an instantaneous variation of a demodulation error and a temporal variation of the demodulation error for each estimated subcarrier based on the weighted pilot carrier, and correcting the estimated propagation coefficients based on the instantaneous variation and the temporal variation, wherein the plurality of demodulation stages each include:

an inverse matrix calculating section for calculating an inverse matrix of a propagation matrix whose elements are the estimated propagation coefficients;

an interference canceling section for performing interference cancellation for the plurality of receive subcarriers by using the inverse matrix, and estimating transmit subcarriers multiplexed in space;

a data demodulating section for demodulating the estimated transmit subcarriers to obtain transmit data;

a data modulating section for re-modulating the demodulated transmit data to produce a plurality of subcarriers;

a replica producing section for multiplying the plurality of re-modulated subcarriers by the corrected propagation coefficients to produce a replica signal; and a calculation section for producing a subtracted signal obtained by subtracting the replica signal from the plurality of receive subcarriers, and outputting the produced subtracted signal, as a new set of receive subcarriers, to the interference canceling section of a subsequent demodulation stage.

* * * * *